(12) United States Patent
Jacobs

(10) Patent No.: US 12,008,838 B2
(45) Date of Patent: *Jun. 11, 2024

(54) PRIVATE PHOTO SHARING SYSTEM, METHOD AND NETWORK

(71) Applicant: CloudSpotter Technologies Inc., Highland park, IL (US)

(72) Inventor: Ryan Jacobs, Highland Park, IL (US)

(73) Assignee: CloudSpotter Technologies, Inc., Highland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,130

(22) Filed: Apr. 7, 2023

(65) Prior Publication Data
US 2023/0290177 A1  Sep. 14, 2023

Related U.S. Application Data

(63) Continuation-in-part of application No. 17/140,394, filed on Jan. 4, 2021, now Pat. No. 11,651,619, which is a continuation of application No. 16/582,103, filed on Sep. 25, 2019, now Pat. No. 10,885,307, which is a continuation of application No. 14/489,116, filed on Sep. 17, 2014, now Pat. No. 10,460,151.

(60) Provisional application No. 61/878,949, filed on Sep. 17, 2013.

(51) Int. Cl.
*G06V 40/16* (2022.01)
*G06F 16/583* (2019.01)
*H04L 67/06* (2022.01)

(52) U.S. Cl.
CPC ............ *G06V 40/16* (2022.01); *G06F 16/583* (2019.01); *G06V 40/172* (2022.01); *H04L 67/06* (2013.01)

(58) Field of Classification Search
CPC ...... G06V 40/16; G06V 40/172; G06V 20/30; G06F 16/583; G06F 16/51; G06F 16/5838; G06F 16/5866; H04L 67/06
See application file for complete search history.

(56) References Cited

U.S. PATENT DOCUMENTS

| | | | |
|---|---|---|---|
| 8,208,694 B2 | 6/2012 | Jelonek | |
| 8,583,683 B2 * | 11/2013 | Rathod | .............. G06Q 30/0249 707/770 |
| 8,904,181 B1 * | 12/2014 | Felsher | ................. H04L 9/0841 380/282 |
| 9,020,966 B2 | 4/2015 | Erol | |
| 2005/0240970 A1 * | 10/2005 | Schwalb | .................. H04N 7/18 725/74 |
| 2009/0185723 A1 | 7/2009 | Kurtz | |
| 2010/0158315 A1 | 6/2010 | Martin | |

(Continued)

OTHER PUBLICATIONS

Notice of Allowance U.S. Appl. No. 16/582,103 copending application; dated Feb. 9, 2020.

(Continued)

*Primary Examiner* — Sm A Rahman
(74) *Attorney, Agent, or Firm* — Adam K. Sacharoff; Much Shelist, P.C.

(57) ABSTRACT

The present invention is a photograph sharing process and/or system that identifies photographs to users based on biometric objects and/or non-biometric objects. The photographs can then be shared or sent to users with certainty and in which a subject or individual appears directly in that particular photo.

20 Claims, 26 Drawing Sheets

(56) References Cited

U.S. PATENT DOCUMENTS

| | | | |
|---|---|---|---|
| 2011/0055045 A1* | 3/2011 | Smith | H04N 1/00145 |
| | | | 705/26.5 |
| 2011/0188713 A1 | 8/2011 | Chin | |
| 2011/0280497 A1 | 11/2011 | Berger | |
| 2012/0250950 A1 | 10/2012 | Papakipos | |

OTHER PUBLICATIONS

Notice of Allowance U.S. Appl. No. 14/489,116, copending application; dated Jun. 17, 2019.

Notice of Allowance U.S. Appl. No. 17/140,394, copending application; dated Jan. 9, 2023.

* cited by examiner

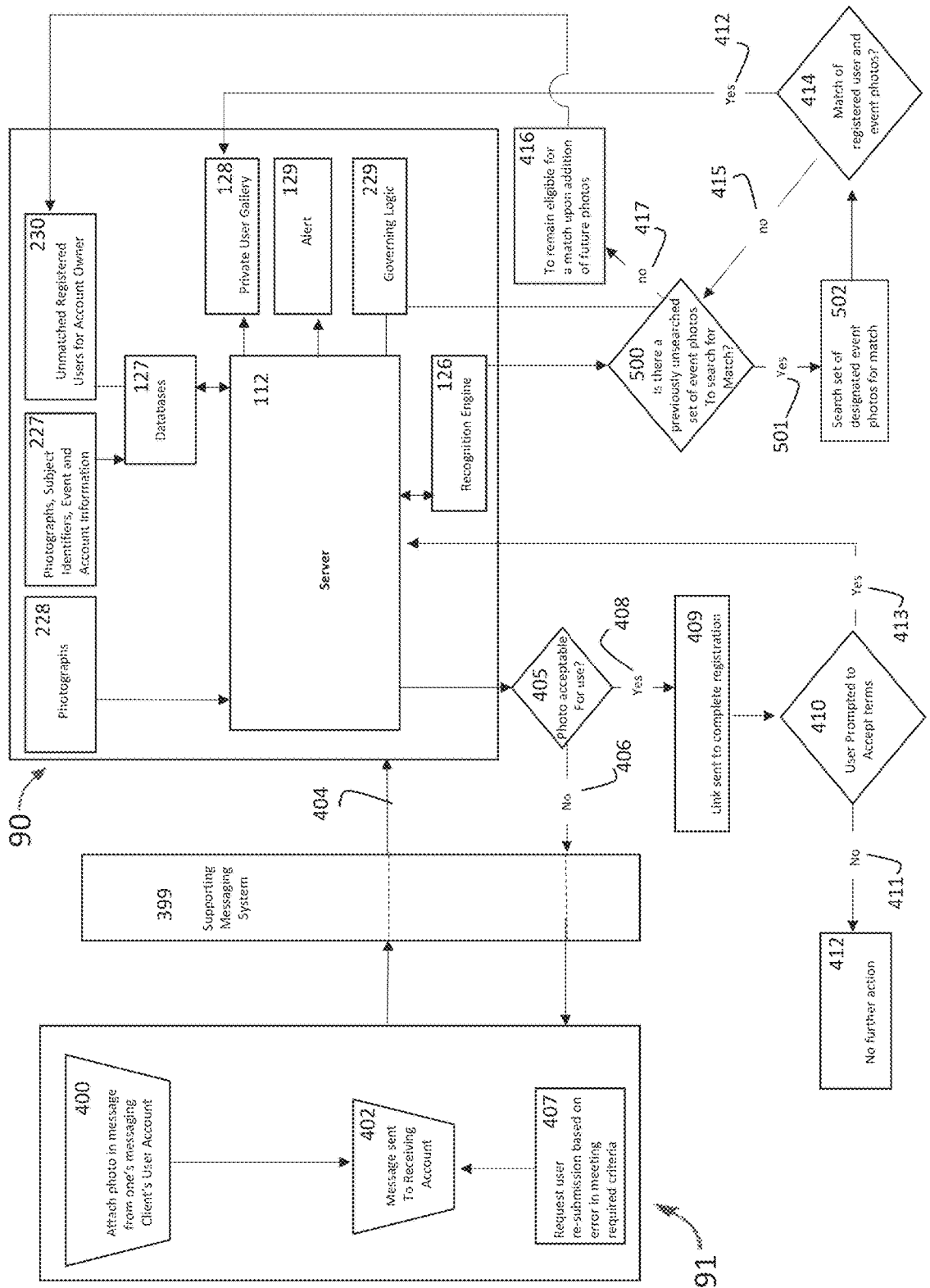

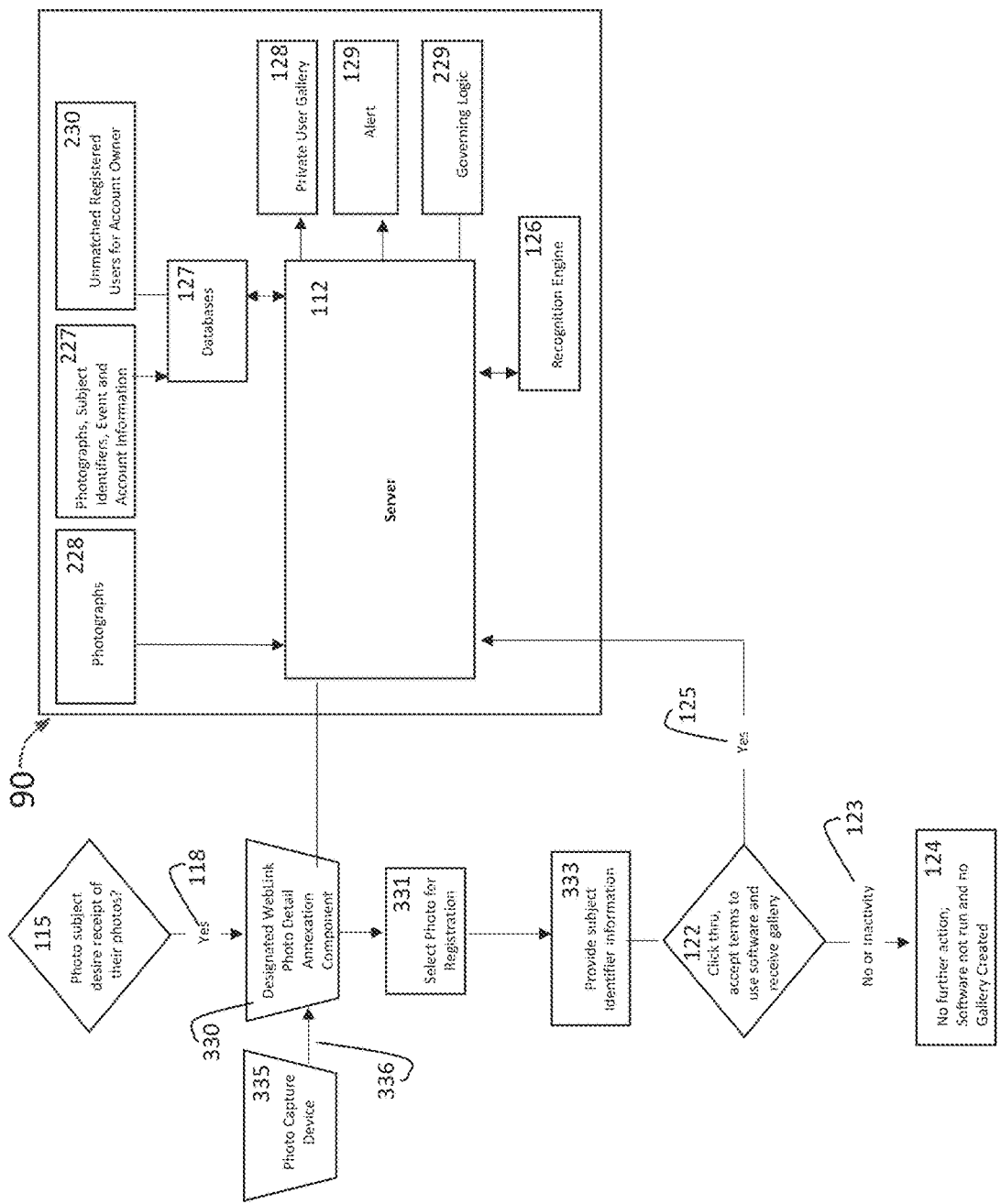
Fig. 11|

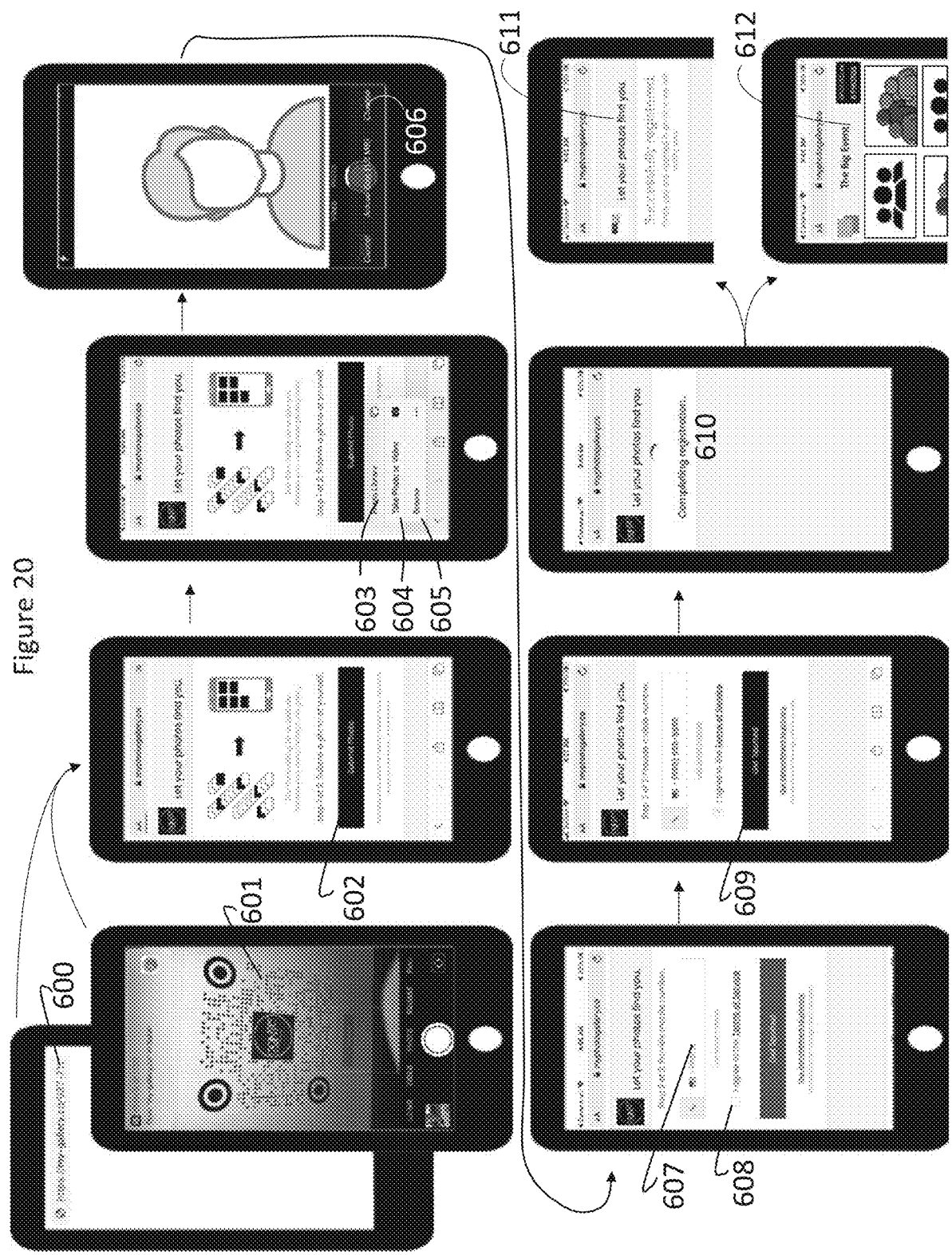

PRIVATE PHOTO SHARING SYSTEM, METHOD AND NETWORK

CROSS-REFERENCES TO RELATED APPLICATION

The application is a Continuation in Part of U.S. patent application Ser. No. 17/140,394 filed Jan. 4, 2021, which is a Continuation Application of U.S. patent application Ser. No. 16/582,103 filed Sep. 25, 2019 now U.S. Pat. No. 10,885,307 issued on Jan. 5, 2021, which is a continuation of U.S. patent application Ser. No. 14/489,116 filed Sep. 17, 2014 now U.S. Pat. No. 10,460,151 issued on Oct. 29, 2019, and which claims priority to U.S. Provisional Patent Application No. 61/878,949 filed Sep. 17, 2013, entitled "Private Photo Sharing System, Method and Network", the entire contents of all of the above are incorporated herein by this reference.

FIELD OF INVENTION

The present invention generally relates to a process and system for sharing photographs. The present invention also relates to a photo sharing network among and between users of the network.

BACKGROUND OF THE INVENTION

More photos are being taken now than ever before and photograph sharing among and between people is becoming more and more popular. Arguably, the most heavily shared images are social photographs, that is, photographs of social nature including people as subjects which may be taken at events, such as weddings, parties, sporting, and other events, or which may also be taken elsewhere, beyond the confines of an event. People photographed generally have a strong desire to gain access to the photographs they are in, and those individuals who snap a photograph of people often have a moderate desire to share that photograph with those people in the photograph. While over time advances in digital, Internet, and mobile technologies have continued to lower barriers to sharing photographs, there are still significant challenges associated with doing so, and particularly with privately sharing photographs with intended recipients. Currently, it is common for photographs to be shared via email, text message, Facebook, and Instagram to name a few sharing methods, and placed on websites to which persons interested in accessing photographs can go to view, retrieve, download, or purchase the photographs. While the aforementioned sharing methods and technologies make it easier now to share photos than ever before, there are a few major drawbacks to these sharing methods. First, these sharing methods are not automatic; they require manual activity not only on the part of the photo-sharer, but to varying extents also on the part of the photo-share (recipient of photo), and, as a result of such hurdles, often photographs are not successfully shared. Secondly, photos are being shared through a wide variety of mediums and are being stored in a wide variety of locations, which can make accessing and managing photos very challenging. Yet another significant drawback to several of these sharing methods is that the photographs may become public domain, or semi-public domain, accessible by either a very small amount or larger amount of people whom either the publisher of the photographs and/or the subjects in the photographs may not want to view them, or by recipients who do not wish to view them.

Moreover, in the case of professional photographs taken at weddings and other events, proof books or website links are often sent around to the people who engaged the photographer(s) and sometimes to other event attendees who might be interested in accessing some of the photographs. This results in a delay between the event and the time at which attendees can access photographs, failing to provide such access in a timely fashion. This also requires effort on behalf of users to seek out the photos for which they may want access.

SUMMARY OF THE INVENTION

In one embodiment, the photograph sharing process and system of the present invention allows professional photographers, who photograph weddings or other events where large numbers of photographs each containing varying quantities of photo subject, to send photographs in which the subject appears directly to that particular individual. Thus, the photographs are shared only with intended recipients and may be viewed essentially simultaneously. In this embodiment, the photograph sharing process includes the steps of associating a photograph with a file name and with a subject identifier (such as a name, email address, cell phone or other unique identifier) or identifiers, in the case of sharing a photo with multiple recipients. This process also includes creating a database record on the server for the photograph file name and subject identifier. The database record and photograph are uploaded to a server. The photograph, or link to the photograph, is also forwarded to the subject(s) associated using the subject identifier.

In another embodiment, the photograph sharing process and system of the present invention uses face detection and facial recognition technology to direct photographs taken of individuals, for instance, at an event such as a wedding, to the individual subjects actually appearing in the photographs. In this embodiment, the photograph sharing process includes some form of user registration, whereby a photograph or set of photographs are provided with associated subject identifier and, if more than one face appears in a given photo, a plurality of subject identifiers corresponding to subjects appearing in the photograph(s). The database records containing the photograph file name and subject identifiers, along with the photograph are uploaded to and stored on a server. Face detection and recognition are performed on the uploaded photographs to provide facial metrics for the subjects appearing in the photographs. The facial metrics of the subjects appearing in the photograph(s) are associated with the subjects' identifiers and stored on the server. The photographs used to register users, or a link to these photographs, are forwarded to the subjects. Also, additional photos uploaded to the system may be forwarded to subjects if, after undergoing face detection and recognition are determined to include faces which result in a match, at a pre-determined level of certainty, for subjects when compared against facial metrics belonging to a relevant set of registered user records. It is worth noting that there are several derivations to the aforementioned embodiment. While a professional photographer can send photographs to the server using this system, use of the system need not be limited to a professional photographer or group of professional photographers; individual event attendees can also take photographs with their cameras or Smartphones which through a variety of potential channels can be sent through the system either during the event or after the event, either alongside or even independent of professional photographer use of the system, similarly resulting in automated private sharing. Also worth noting is the fact that individuals at a given event need not necessarily register at the event; it is possible for individuals to register through a wide variety of ways either in advance or afterwards and still be eligible to automatically receive access to photographs they are in which run through the system.

In a further embodiment, a photograph sharing network process is provided that allows a user to privately aggregate and store large quantities of his or her photographs, while at the same time enables a user to share photographs among and between users of the network. Facial recognition technology allows photographs uploaded to the network to be shared privately between and among users essentially automatically. The network can also alert users when a photograph in which they appear is available within their private account on the network. In this embodiment, the photograph network sharing process includes the steps of providing a user facial metrics upon registration and storing the user facial metrics on a server. Sets of photographs are uploaded to the server through a variety of ways with the intention to store and privately share these photos. Face detection and recognition is performed on all uploaded photographs to provide facial metrics for subjects appearing in the photographs. The subjects' facial metrics can then be compared to the facial metrics of the uploading user as well as the facial metrics of individuals the uploading user is associated with on the photograph sharing network to determine if there are matches and therefore photographs which can be automatically and privately shared. Photographs uploaded to the system containing a face or faces with facial metrics matching a given user or given users facial metrics become associated with the matching user accounts and are thereafter automatically and privately accessible to those users. As new users join the network and connect with a group of friends, the facial metrics of faces belonging to friend photos are compared with the facial metrics of the new user account. In the case of matches, the new user account will populate with such associated photos. From that point on, anytime that user uploads photos, the facial metrics for individuals in such photos will be compared against the facial metrics for anyone that person is connected to. In a similar fashion, anytime a connection of that user uploads photos, the facial metrics for that user and any of the other users the connection is connected to will be crossed when referencing newly uploaded photos to see if there are matches.

Still a further embodiment includes a photograph with a file name and with a subject identifier taken by a wireless photographic device; a server connected to the Internet for receiving and for creating a database to record and to store the photograph with the file name and with the subject identifier; an input to the server to pre-upload event information associated with the photograph, to pre-upload subjects facial recognition metrics and additional photographs thereof into the database for later comparison with the photograph taken by the wireless photographic device; and forwarding the photograph to a particular subject associated with the photograph using the file name and subject identifier for each subject determined to match the facial recognition metrics with subject identifier stored in the server with event information, wherein a photographer taking photos at weddings or other events where large numbers of photographs containing various subjects enables the photographer to send photographs in which the subject appears directly to the subject with facial metrics and subject identifier in the server.

While the descriptions which follow make reference to photographs, it is important to note that videos, essentially a collection of photograph frames, can also be shared through using the present invention. It will also be apparent that in addition to photographs and videos, the present invention can be used to share documents, or any other digital file.

BRIEF DESCRIPTION OF THE DRAWINGS

To understand the present invention, it will now be described by way of example, with reference to the accompanying drawings in which:

FIG. 11H is a schematic view outlining a user-self-registration process within an embodiment of the present invention, utilizing photo content independent of an event's official set of photos for the purpose of registration, and using a messaging platform as the photo detail annexation component, while determining event association through a recursive search process;

FIG. 11I is a schematic view outlining a user-self-registration process within an embodiment of the present invention, utilizing photo content independent of an event's official set of photos making use of unique designated weblinks mapped to specific events;

FIG. 20 illustrates from the user perspective an example of how self-registration can take place through a photo detail annexation component accessed by a weblink, in accord with an embodiment of the present invention.

DETAILED DESCRIPTION

Figure 1:
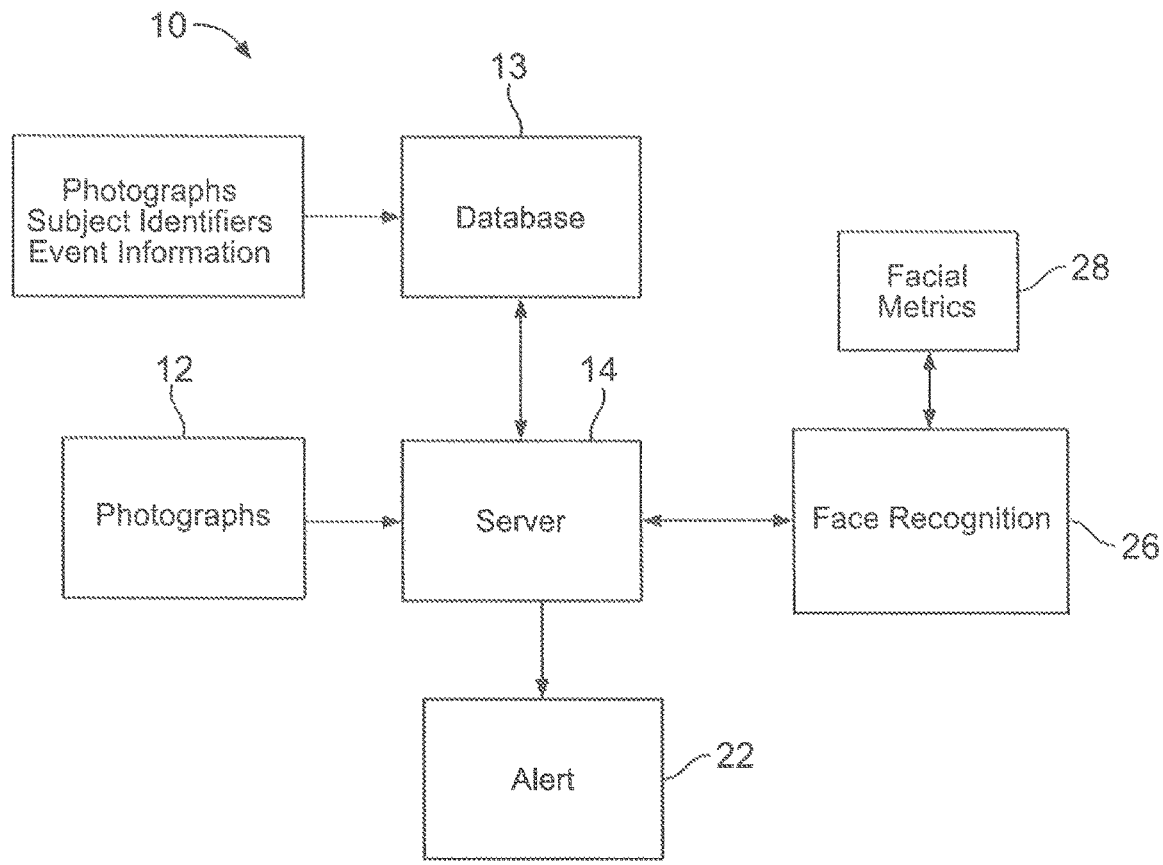
FIG. 1 is a schematic view of a photograph sharing process of an embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
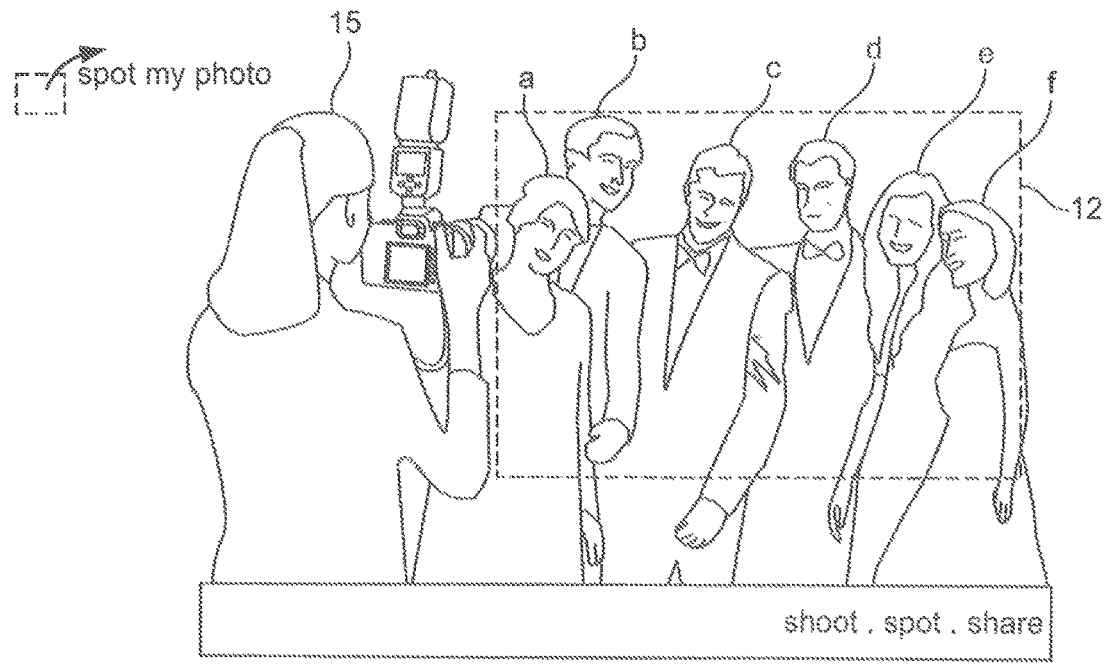
FIG. 2 is a photograph taken in accord with an embodiment of the present invention.

Referring to the Figures, FIG. 1 is a schematic of the photograph sharing process and system 10 of an embodiment of the present invention. Photographs 12 are taken, perhaps at an event such as a wedding, and are uploaded to a server 14 (FIG. 2). The photos 12 can be uploaded to a specified directory on the server 14 using Wi-Fi, Bluetooth, or any other available means. The photos 12 can be in any digital format and can be sent directly from a camera memory card as a native digital file or can be digital files rendered from scanned prints or slides.

Figure 3:
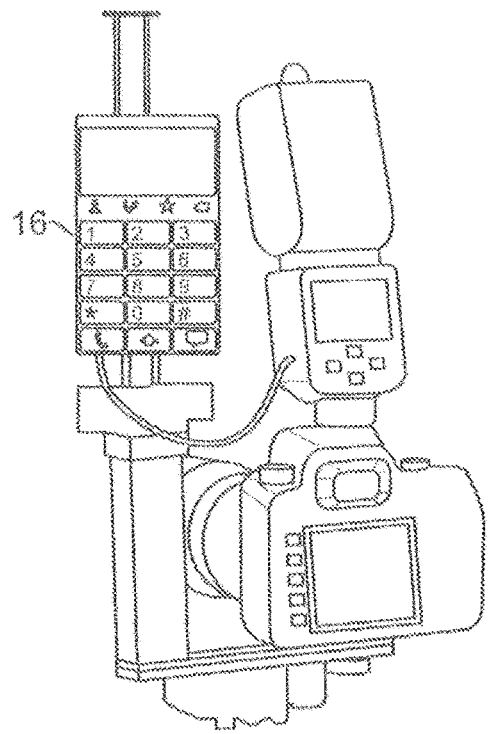
FIG. 3 is an input device in accord with an embodiment of the present invention.
Figure 4:
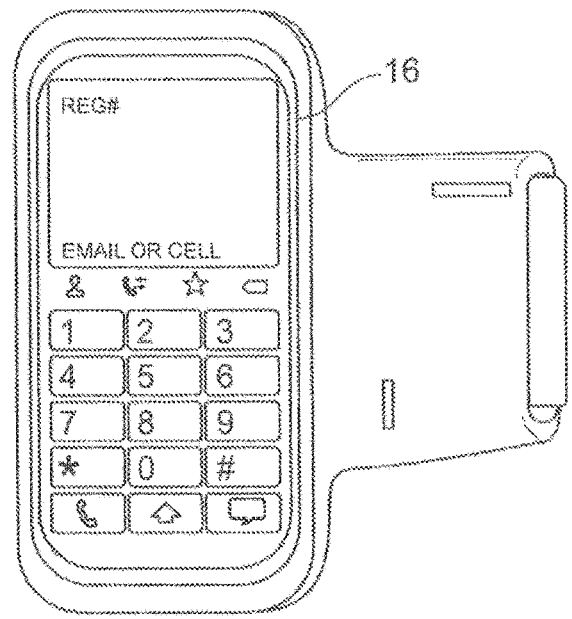
FIG. 4 is an input device in accord with an embodiment of the present invention.
Figure 5:
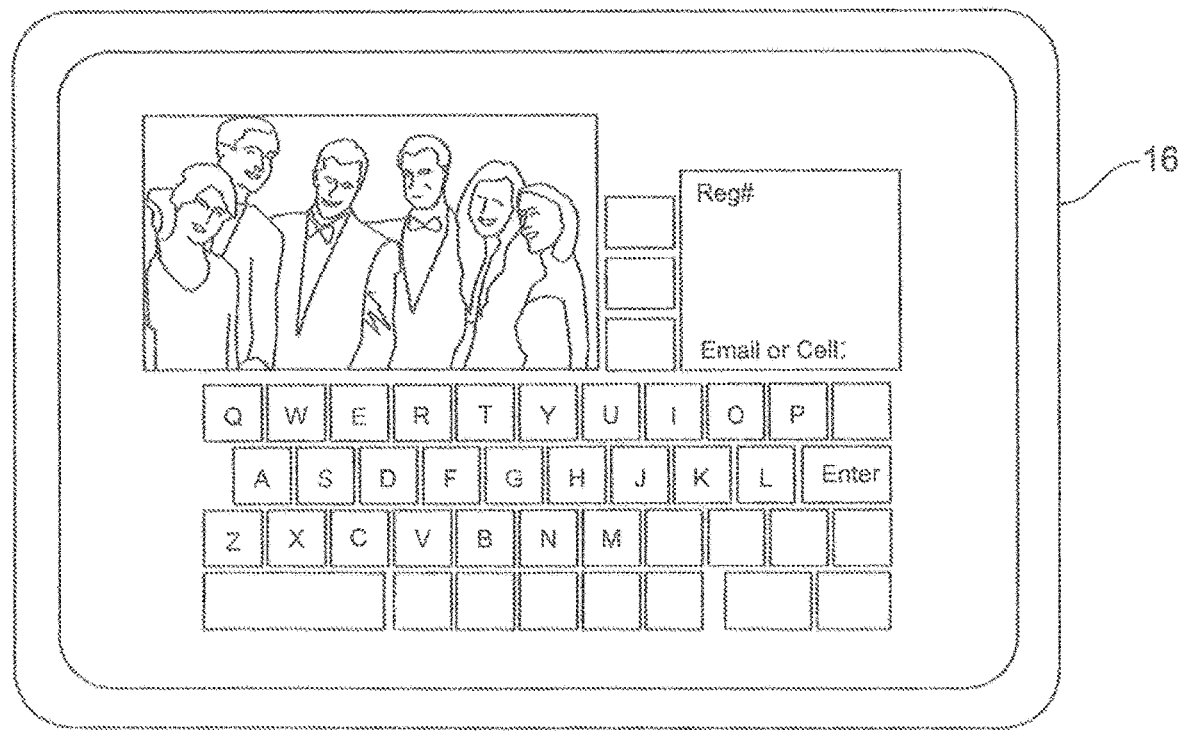
FIG. 5 is an input device in accord with an embodiment of the present invention.
Figure 6:
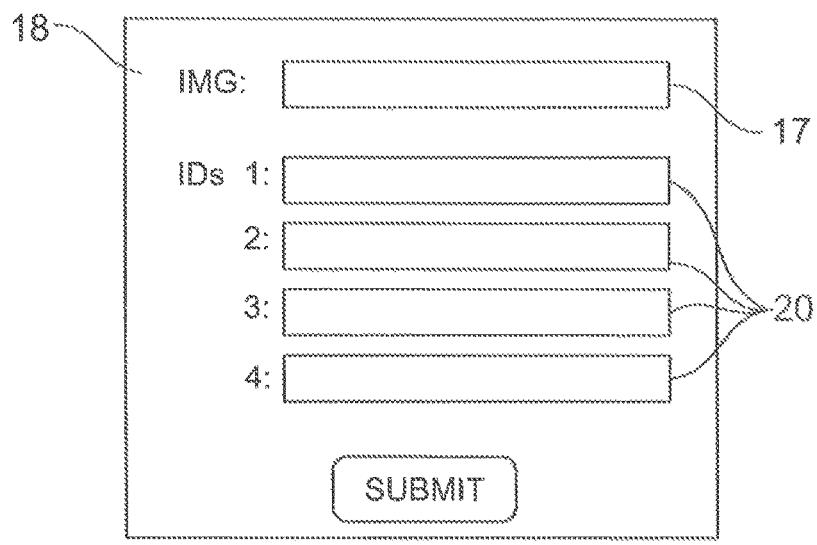
FIG. 6 is an input in accord with an embodiment of the present invention.
Figure 9:
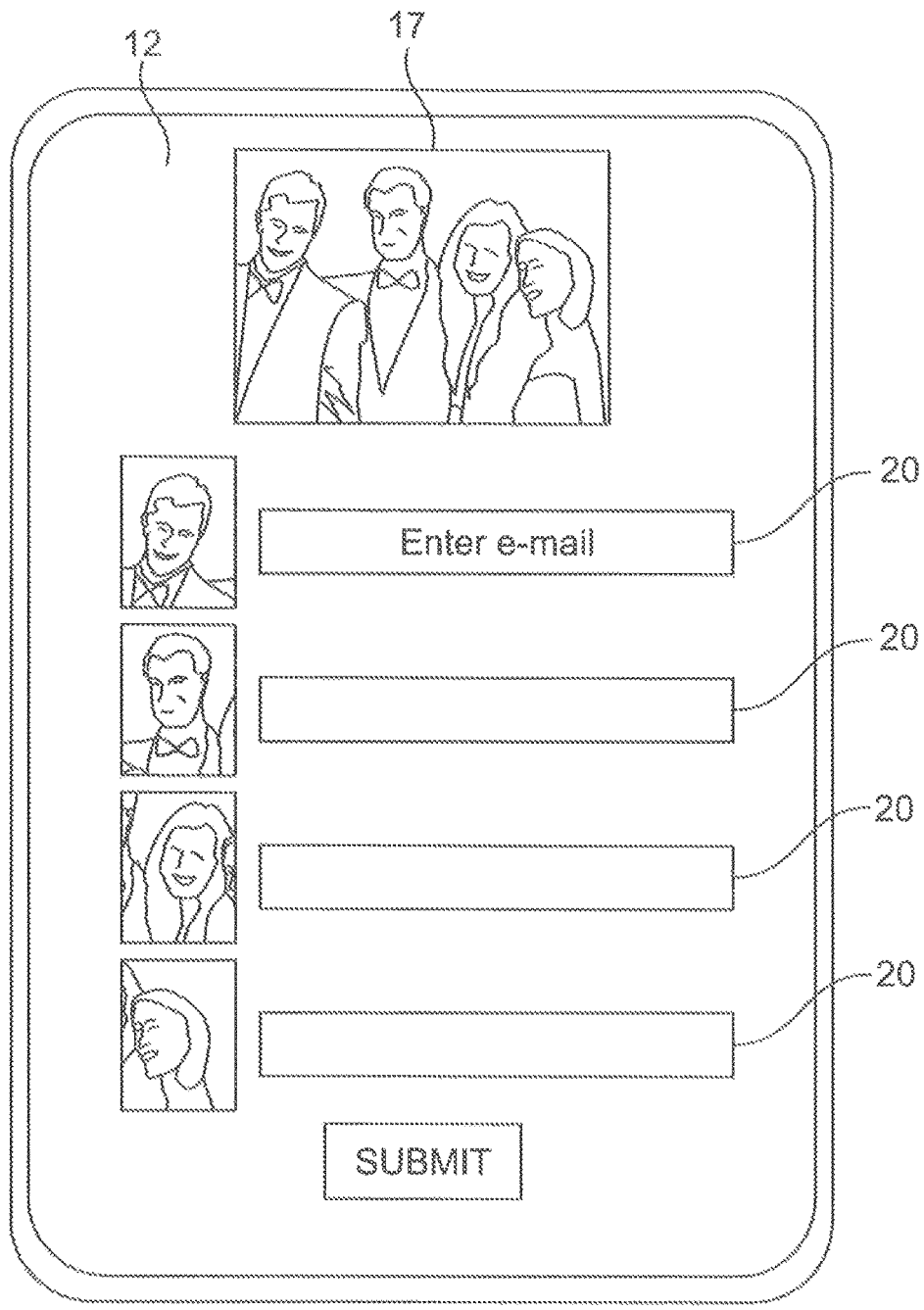
FIG. 9 is an input device in accord with an embodiment of the present invention.

In one embodiment, a photographer 15 can be equipped with an input device 16 as shown in FIGS. 3-5 that can be attached to a camera (FIG. 3), or worn on the photographer's arm or wrist (FIG. 4), a tablet (FIG. 5), or on any suitable mobile device. The device 16 may include an application or app specifically adapted to allow photo sharing using process and system 10 of the present invention. The device 16 allows the entry of information regarding the photos 12 via an input 17 (FIG. 6) such as the image number 18, or another associated file name, as well as information identifying the subject or subjects of the photograph (subject identifier 20). The subject identifiers 20 for multiple subjects in a photograph should be entered as the subjects appear from right to left in the photograph 12 designated as a through f in FIG. 2. Alternatively, subject identifiers 20 for multiple subjects in a photograph could be entered into a tablet app (FIG. 9) which is receiving a feed of photos from the photographer and running an application using face detection. The subject information can be any desired identifier 20 such as email address or cell phone number.

Persons attending the event can also be registered to be automatically eligible to receive a link to their photos. Their registration can include a subject identifier 20 to associate such persons with photographs in which they appear. This registered identifier 20 can be provided to the photographer 15, a supporting staff member or can be manually entered as part of an independent registration process before, during or after an event through a kiosk, tablet, Smartphone, computer, or the like with an application or website supporting the photo sharing platform. The registration can also include, if desired, contact information for the subject such as an email address or cell phone number. A different subject identifier such as a name can also suffice if that subject identifier can be cross-referenced with a data set provided by an event organizer which associates that given subject identifier with respective contact information such as an email or cell phone number.

Figure 7:
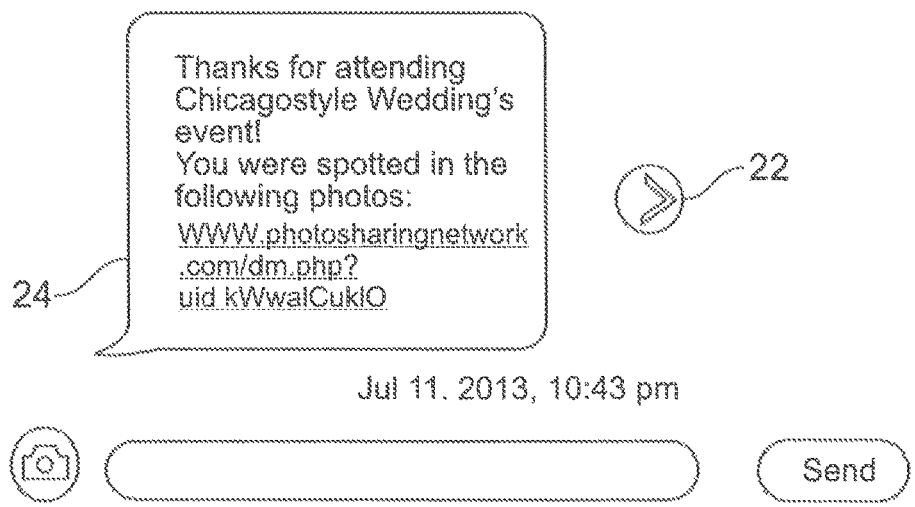
FIG. 7 is an alert in accord with an embodiment of the present invention.

In an embodiment of the present invention, the photographer 15 photographs subjects a-f, or any number of subjects. The photographer 15, or the subjects a-f, or any other person, enters this/her contact information, such as email or cell phone number, in the subject identifier 20 fields. This information along with the associated photograph 12 is stored in a database 13 and is uploaded to the server 14. After uploading to the server 14, the photograph 12 can be forwarded to the subjects a-f via their assigned subject identifier 20. For instance, the subjects a-f would receive an alert 22 informing them of the availability of the photograph 12 for viewing and providing a link 24 at which the subjects a-f could view the photograph 12 (FIG. 7).

In addition, to sending the photograph 12 to the subjects a-f, the photograph 12 can include processing. For instance, the photograph can be processed to include a border around the photograph, information regarding the event at which the photograph 12 was taken, or other desired designs or effects. In another embodiment, after the photograph 12 is uploaded to the server 14, face recognition 26 can be run on the photograph 12 using any suitable face recognition software, including Face.com API (Acquired and privately integrated by Facebook), SkyBiometry.com API, Rekognition.com API, Lambda Labs: Lambdal.com, BetaFace.com, Cognitec: cognitec-systems.de, and Neuro Tech neurotechnology.com. The software determines facial metrics 28 for each of the subjects a-f appearing in the photograph 12. These facial metrics 28 can generally result from either geometric approaches, which look at distinguishing features (facial landmarks and associated ratios, distances and shapes using either two-dimensional or three-dimensional approaches), or photometric approaches, which are statistical and distill images in values and compares the values with templates to eliminate variance. The facial metrics 28 permit the software to identify other photographs 12 in which each of the subjects a-f appears. The facial metrics 28 corresponding to the subjects a-f of the photographs 12 are linked and stored on the server 14.

Additional photographs 12, perhaps those taken at the same event can be uploaded to the server 12. Face recognition 26 software performs facial recognition on the additional uploaded photographs 12 and determines the facial metrics 28 for the subjects a-f appearing in them. The facial metrics 28 of those subjects a-f identified are compared with the facial metrics 28 of subjects in the additional uploaded photographs 12. When the stored subjects a-f facial metrics are found to be present in a photograph 12, the photograph 12 is forward to that subject using the identifiers 20.

Figure 8:
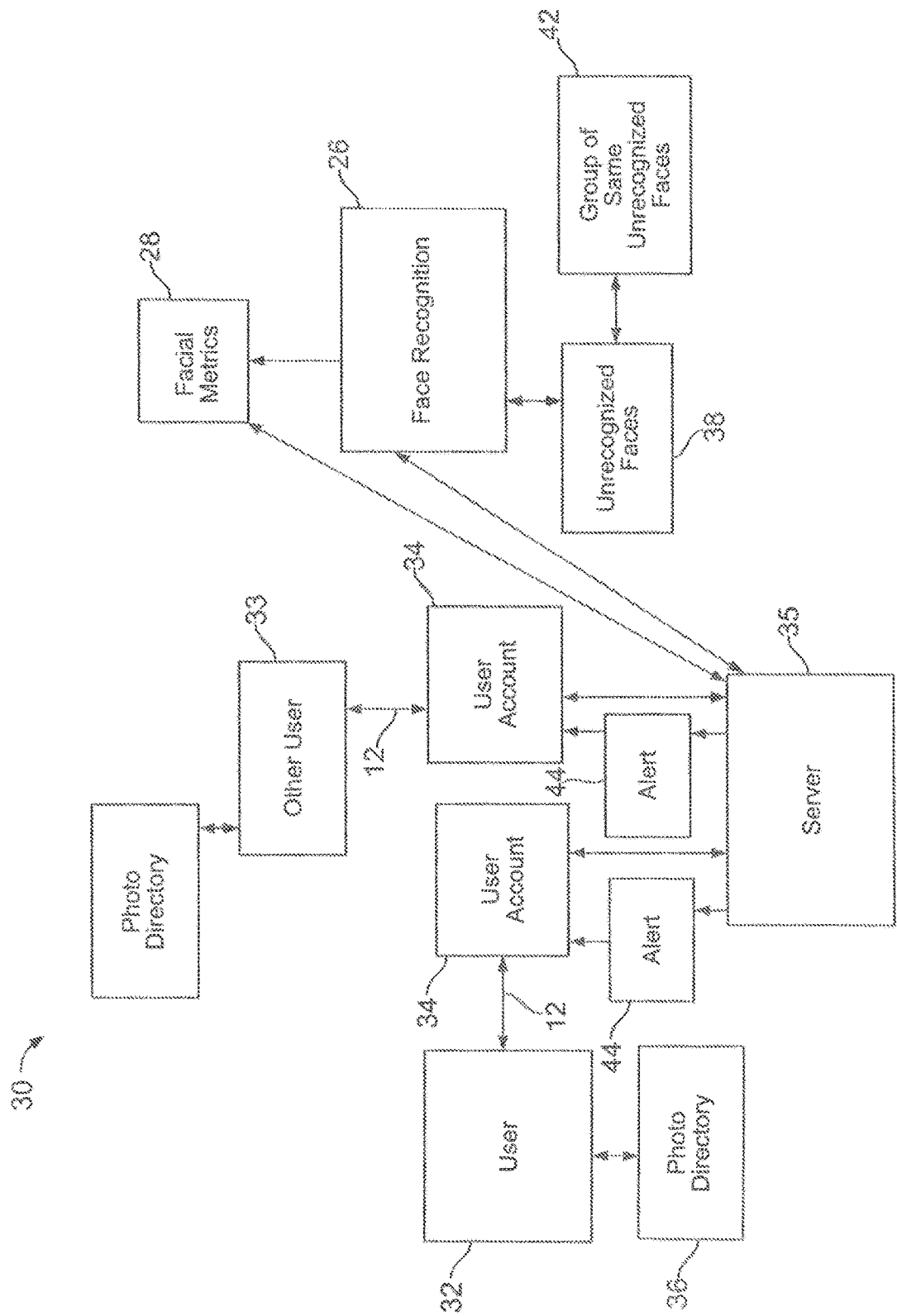
FIG. 8 is a schematic view of a photograph network sharing process of an embodiment of the present invention.

In another embodiment, the present invention provides a photo sharing network 30 FIG. 8). The network 30 allows users to store large quantities of their own photos like other photo aggregator sites, and also easily share photos 12 with family and friends, while allowing the sharing to be private. The photo sharing network 30 requires a user 32 and other users 33 to create an account 34. The user accounts 34 are stored on a server 35. The users 32 and 33 interact with the network 30 via a user interface. The users 32 and 33 can upload photos 12 to their accounts 34 via server 35, can import photos 12 stored on other websites and can even create dynamic connections with other websites or sources (like a Smartphone or computer) which can check for new photos to import in perpetuity. In the latter case, these dynamic connections are enabled when a user gives permission to a service-specific application which can both check and passively initiate the uploading of new photos to one's private account on the photo sharing network.

The user 32 provides a registration photo or set of registration photos 12 or can use photos the user appears in shared photos by friends on the network, from which his or her facial metrics 28 are determined using face recognition. The facial metrics 28 are stored in connection with the user account 34. A user 32 may upload or import photos 12 to his account 34. These photos 12 are stored on a server 14. Facial recognition software acts on the photos 12.

Once uploaded to the server 14, the face recognition compares the user 32 facial metrics 28 with the uploaded or imported photos 12 and determines whether the user 32 appears in any of the photos 12. If so, the photos 12 are made accessible to the user through a directory 36 called, for example, "Photos of Me" associated with the user account 34. Moreover, other users 33 on the network 30 to which the user is connected have also provided their facial metrics 28. The photos containing other users' faces are directed to such other users 33, and in such a way, the same function is performed on the photos of all other users, looking for matches within their respective relevant user connections.

For unrecognized faces 38 appearing in the uploaded or imported photos 12, coordinates from the photograph 12 surrounding the face are determined and stored on the server 14. The portion or cutout of the photograph 12 containing the unrecognized face 38 will also be stored and will continue to be associated with the original photo 12 file and associated user account. The facial recognition will create groups 42 of the cutouts of the same unrecognized face 38.

The user 32, through the interface, will have access to the group 42 of cutouts containing the unrecognized face 38 of the same person, as well as their associated photos 12. By identifying an unrecognized face cutout using an email address, name or other unique identifier, a user is able to share the parent photo and all other parent photos related to other cutouts within a group. These photos 12 can be easily shared with other users 33 on the network 30, such as the person, previously unidentified, who appears in the photograph 12. Once the photos 12 are shared, a connection between the users' accounts 34 is created such that the other user face is also searched for in photographs 12 uploaded to the server 14 by either user 32. This connection requires permission of the other user 33.

When the face recognition 26 determines that the other user 33 face appears in a photograph 12 to a pre-determined level of certainty, the photo 12 is sent to the other user account 34. An alert 44 such as an email or text message can inform the other user 33 that the photo 12 has been sent to their account 34.

In another embodiment, an event such as a wedding is given a unique identifier. The set of photographs and users and subjects of photographs are identified as associated with a particular event are uploaded to and contained within the database. When the facial metrics of subjects in the photographs of that set are determined, the facial metrics of subjects in the relevant set of uploaded photographs compare those facial metrics of the users and subjects associated with the event.

Figure 10:
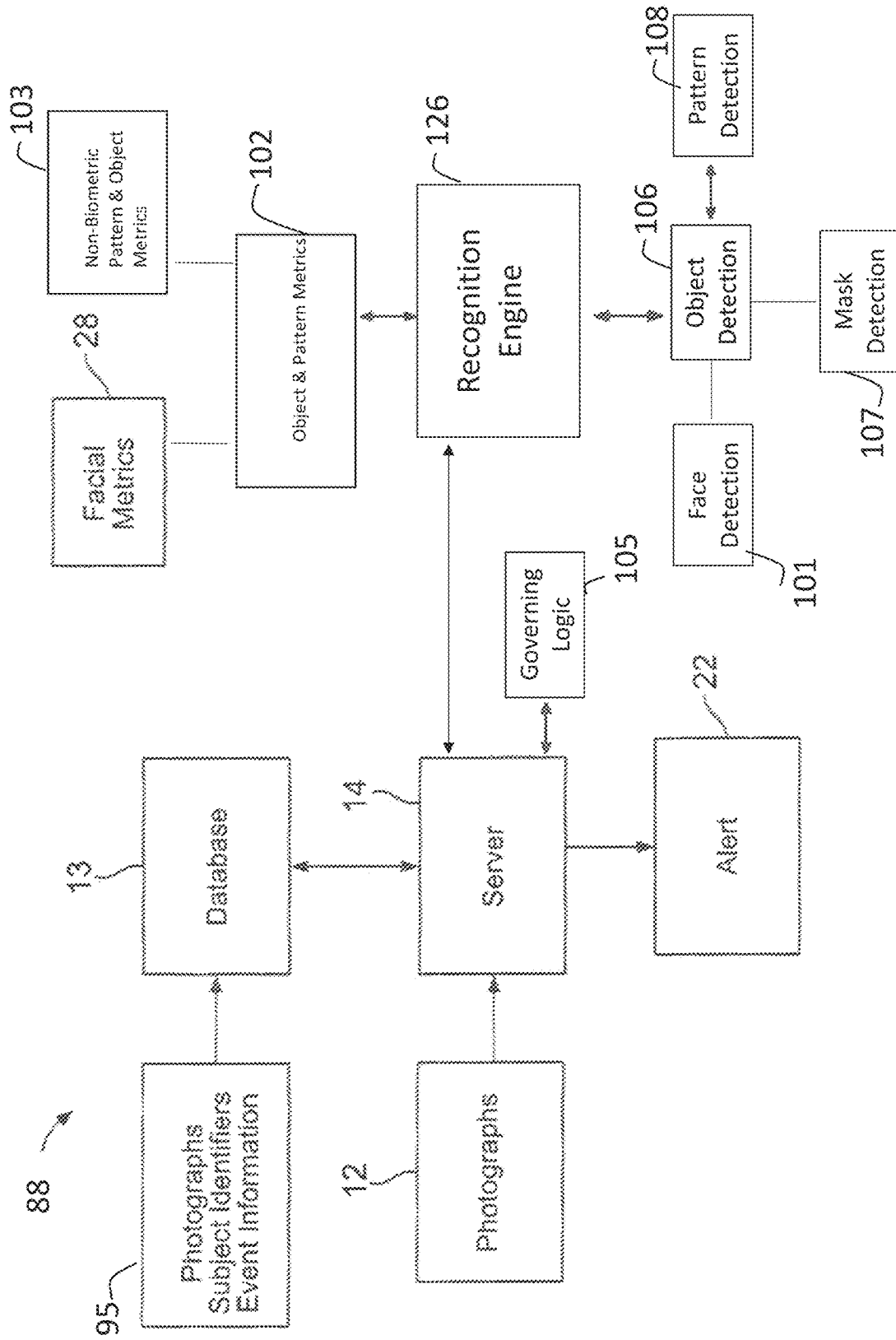
FIG. 10 is a schematic view of a photograph sharing process as a special case embodiment of the present invention previously shown in FIG. 1, whereas pattern recognition engine can encompass matching facial metrics and/or other non-biometric pattern metrics.

Referring now to FIG. 10 and to expand upon the core system flow outlined in original FIG. 1, other methods may follow the same general workflow as can be visualized functioning as a collective System 88. Here more detail is provided on components and processes supporting the function of the Recognition Engine 126, including some examples of the breadth of use cases that this workflow can support. Object detection 106 is used to match objects in images being processed with models of objects already stored and represented by Object and Pattern Metrics 102. A numeric scale such as 1 to 100 is used to quantify the degree to which the metrics of an object conform to such previously stored models. An object in an image being processed is only considered to be a match when it meets a specific pre-determined value upon that numeric scale, known as a confidence level threshold, represented in FIG. 10 within a set of governing logic 105. The value of the confidence level threshold can be variable depending upon the associated objects and/or a set of associated circumstances. The logic for how to apply such variable confidence thresholds for the sake of this figure will also reside within the set of governing logic 105.

In FIG. 10, photographs 12 are taken, and transmitted by WIFI, corded connection or any other means to a specified directory on a server 14. Photos are then processed by the recognition engine 126. Here, an image undergoes object detection 106, where models of defined objects previously stored as object and pattern metrics 102, are cross referenced with an image being processed or components within that image. Based on confidence level thresholds residing with governing logic 105, objects within an image being processed may be determined to match models stored within object and pattern metrics 102. In the case of a match, a processed photo will be associated in the database 13 with the matched account and may lead to a notification alert 22 for the photo subject, assuming such an alert is permitted based upon governing logic 105. Of note, the types of object models stored and utilized can include but are not limited to including facial metrics 28 and non-biometric object metrics or pattern metrics 103. Similarly, Object Detection 106 can include but is not limited to including face detection 101 and mask detection 107, and may be further supplemented by patter detection 108, each included for illustrative purposes.

Face Detection as Specific Type of Object Detection

In one embodiment of this process, again referring to FIG. 10, the Recognition Engine 126 can determine whether or not an object within a photo satisfies the criteria for being a human face, as defined by the model and metrics which define criteria for a face, stored in object and pattern metrics 102, and governed by an established confidence level threshold in governing logic 105. In this case, a photograph 12 is sent to a directory upon the server 14. The recognition engine 126 begins processing an image by using a special form of object detection 106, which is Face Detection 101. If this image contains a real human face, assuming a sufficiently effective model for a human face in the form of stored object and pattern metrics 102, the detected object might for example render a 99 out of 100 confidence-level match relative to what the recognition engine designates as a human face, directly dependent upon the criteria for the object of a human face, once again located in its library of object and pattern metrics 102. If however, a processed image were to contain a person as well as, for example, a stuffed doll with a face bearing resemblance to that of a person, the recognition engine may return a 99 confidence level value for the detected object which is an authentic face but perhaps only a 75 for the detected object pertaining to the doll. If in the governing logic 105 the confidence level threshold used to qualify a match with the model of a face had been under these circumstances set to 98 for example, the authentic face's confidence level value of 99 would pass as a qualified match of a detected face, but the doll's face would not pass as a detected human face, having returned only a value of 75 and not meeting that 98 value threshold.

Face Detection Extended to Facial Recognition

Building upon the prior example, and again referring to FIG. 10, once the recognition engine 126 determines that an object qualifies as a face based upon a confidence level threshold, the recognition engine 126 can go one step beyond to determine if that face can be determined to be a match for a specific user. In this case, the recognition engine 126 functions in much the same way as the prior example for detecting a face, but is comparing what are more granular object and pattern metrics, and comparing those with a library of facial metrics 28 that are deemed by governing logic 105 to not only be eligible for matching under certain circumstances but to also meet the threshold for a numeric confidence-level threshold value required to qualify as a match. A photo deemed to match with a given user will be associated with that user in the database 13 and may trigger a notification alert 22 to that associated individual based upon user and/or event preferences 227 residing within databases 127, and/or other circumstantial governing logic 105.

Non-Biometric Pattern Recognition, in Conjunction or Independent of Face Recognition In addition to the preceding case leveraging facial metrics, FIG. 10 also accounts for use cases where Photographs 12 make their way to a server 14, and can still make their way to relevant individuals, yet may make use of non-biometric object and pattern metrics 102 either in conjunction with, or even independent of biometric facial metrics 28.

Use of Both Facial & Non-Biometric Recognition in Conjunction with Each Other

In the former case of using facial metrics 28 in conjunction with logged non-biometric Object and Pattern Metrics 102, the Recognition Engine 126 may be more effective in making recognition determinations than in the case of relying solely on one such input.

Use of Non-Biometric Recognition Independent of Facial Recognition

This latter case encompassing various forms of non-biometric recognition independent of the use of any personally attributable facial metrics 28 is particularly useful as it may conform to an organization's or participant's privacy preferences, or even to comply with privacy laws of certain countries, states or regions. Such non-biometric object and pattern metrics 102 may include but are not limited to including details on color spectrum, shapes or geometry extracted from areas of a photograph appearing within or proximate to a detected object. The flow in these cases would follow that of preceding workflows, leaving classification and interpretations of such objects and patterns to the recognition engine 126 leveraging non-biometric pattern and object metrics 102 and variable confidence-level thresholds set forth within governing logic 105. Any alerts 22 to photo subjects would again follow governing logic 105 and serve the purpose of delivering photos to the relevant photo subjects.

Examples of Non-Biometric Recognition: Patterns Proximate to a Given Object.

The workflows for non-biometric recognition would again follow the same general flows previously referenced. In this case, after an object likely to be worn or attached to an individual in some way is detected as an object (for example a shirt, helmet, shoe, sticker or any such object that can be modeled and stored within a library of defined object and pattern metrics 102), instead of then logging more granular metrics of the object for comparison by the recognition engine 126 with a relevant set of non-biometric object and pattern metrics 103 as explained in some prior examples, Pattern Detection 108 could be applied to an area proximate to the detected object. The resulting pattern metrics reflecting non-biometric components of what someone may be wearing, for instance, would be cross-referenced by the recognition engine 126 with stored pattern metrics 103 to determine a match. If, depending upon a confidence level threshold residing within governing logic 105, a match is determined, the photo containing the matched photo can be associated with a given user account in the database 13 corresponding with such stored pattern metrics 103, and that person can be notified by alert 22. Many methodologies can be taken to arrive at a given set of pattern metrics including but not limited to geometry of shapes, or measurements of color spectrum within a given region of an image or the image as a whole.

Figure 18:
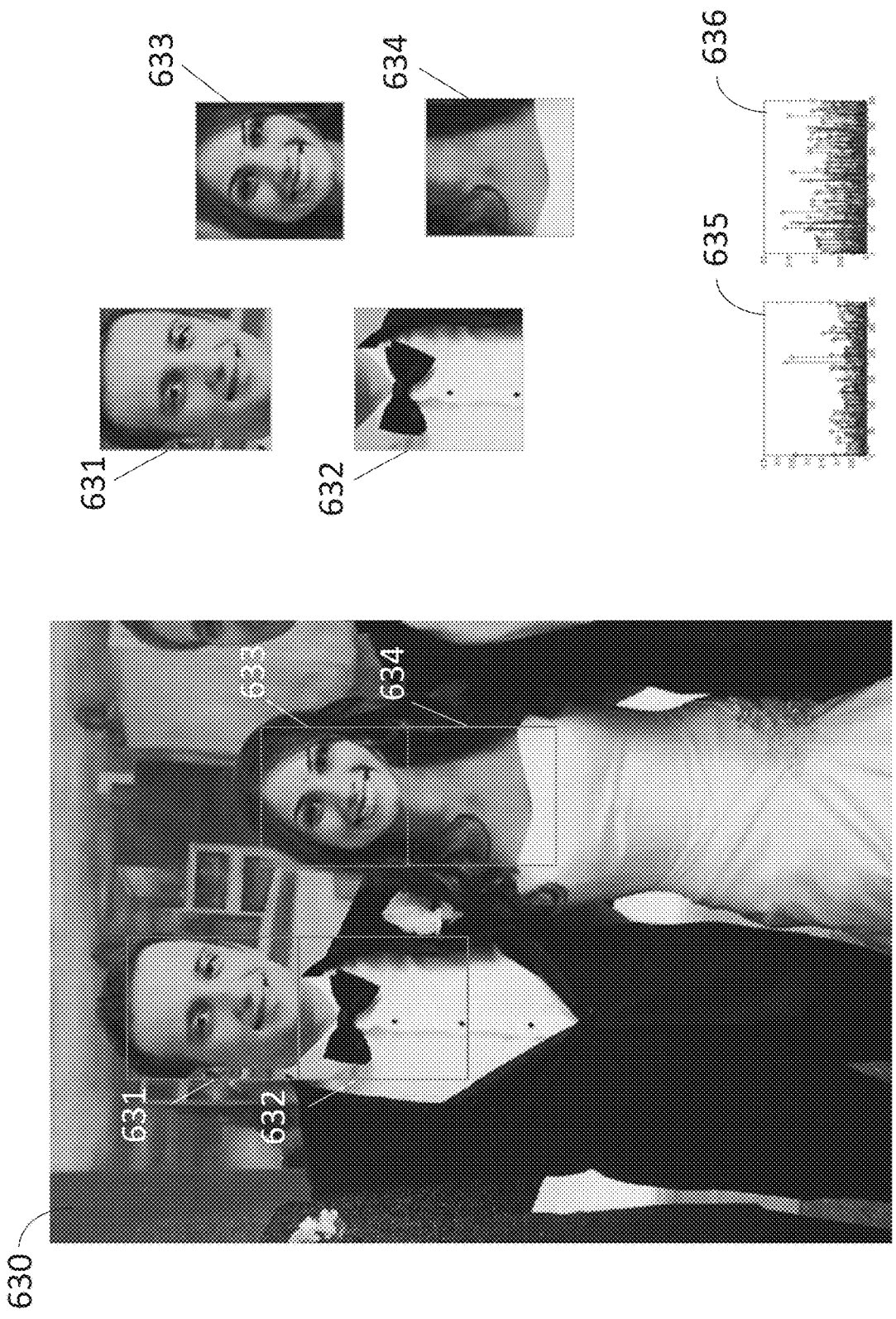
FIG. 18 illustrates how pattern recognition can be used upon regions proximate to a detected object in accordance with an embodiment of the present invention.

In a particularly novel embodiment of the aforementioned process, a purely non-biometric recognition flow could occur to accomplish the goal of associating photos relevant to a given photo subject by using face detection 101 and pattern detection 108 together, without making use of any personal biometric identifiers as in the case of the traditional use of facial recognition relying upon a set of facial metrics 28. Such an approach could focus upon a region of a photo proximate to a detected face, such as for example the region immediately below the bottom of one's face which is likely capturing a distinct portion of what a photo subject may be wearing, and/or the geometry of how what they're wearing lines up with a neckline, for instance. The core concept of this process is illustrated in FIG. 18, where an image 630 has been processed and two faces have been detected including the face of an individual on the left 631 and the face of an individual on the right 633. A specific designated area has been identified 632 that is proximate to the region of a first detected face 631, and a designated area has been identified 634 that is similarly proximate to the region of a second detected face 633. Various analyses can be run upon these proximate regions using object and pattern recognition which represent a unique approach to using non-biometric recognition for the purpose of matching photographs to the photographed people within them. In this one example, pattern metrics in the form of a histogram 635 were generated for the first proximate photo region 632 which mapped Scale Invariant Feature Transformation (SIFT) features extracted from the image to what were the nearest clusters for SIFT features derived from a training set of images using a k-means clustering algorithm, effectively rendering a match based upon a pre-determined confidence-level threshold value. The same process was used upon the second designated region 634 in this example, generating a similar but uniquely associated histogram 636 reflecting extracted pattern metrics that could be used for matching purposes as well. While this specific analysis may have been used in this case, this represents one example of what can be many approaches to using object and pattern metrics for recognition upon designated regions of a photograph for the purposes of photo-indexing aimed at matching photographs to the photographed people within them. Without using biometric recognition, such an approach can be very effective in some circumstances and may be preferably given the privacy preferences as related to the use of biometric metrics and identifiers within the process. However, certain extreme circumstances may present challenges for effective matching using this approach. Some examples of such challenging circumstances might include instances where people are dressed in similar attire such as, for example, team shirts or traditional men's formalwear. These challenges can be addressed in a few ways. One option would be to share potentially matched photos with the plurality of photo subjects that may be a match, likely communicating that a given photo or set of photos may be feature the recipient. However, if the goal remains to share photos privately, exclusively and accurately with those photographed, that objective may still be achieved by the recognition engine 126 when supplemented by additional object metrics and/or contextual information.

Figure 16:
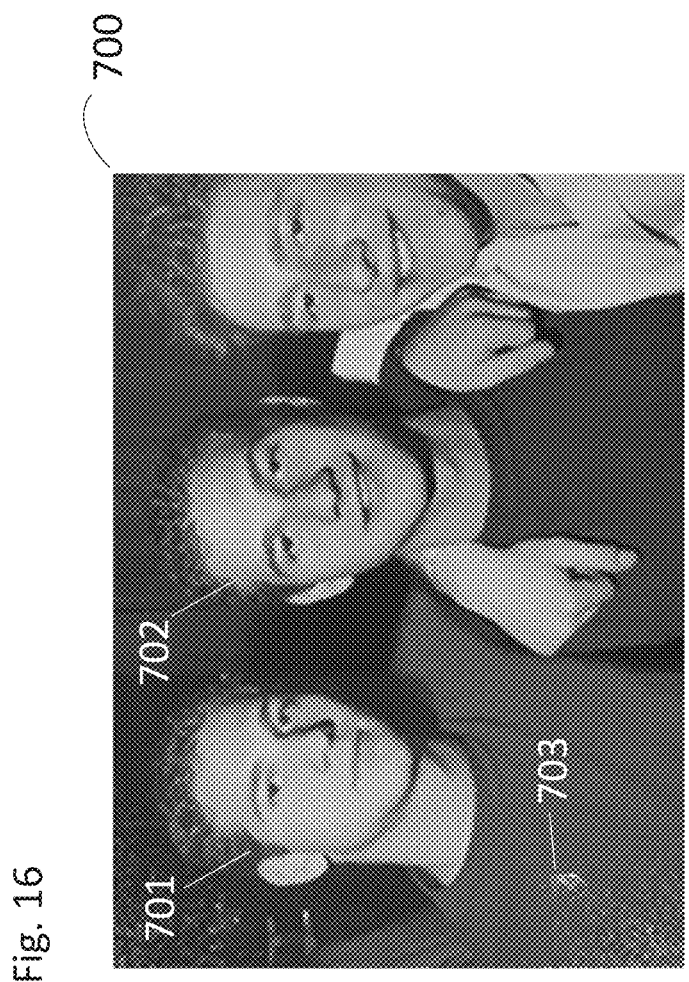
FIG. 16 showcases a challenging extreme edge case in which identical twins wearing similar clothing still have the potential to be successfully differentiated and to receive individual private galleries in accord with an embodiment of the present invention.

One special case which presents a particularly unique challenge is that of delivering correct sets of galleries to identical twins. Given a set of twins are not wearing similar clothing, the aforementioned approach utilizing face detection and then pattern recognition can be successful in returning distinct galleries. However, what happens in the most extreme case in which a set of identical twins are dressed in similar or identical attire? Unfortunately, there is no logical way for the FIG. 10 Recognition Engine 126 to discern between two such individuals given this hypothetical situation. However, even in this circumstance there is a solution conforming to the general flow outlined in FIG. 10. By making use of a single detectable, affixed visual cue such as a sticker, pin or some other object appearing in a region proximate to a detected face 101 in just one of the twin photo subjects, Object Detection 106, leveraging a model in object and pattern metrics 102, can enable the recognition engine to effectively differentiate between individuals. While the recognition engine 126 may be able to recognize a specific logo upon an object such as a pin or sticker, it need not do so, as recognition of the presence of an object that fits the criteria of a pin or sticker is in and of itself able to yield unique differentiable results. As an example, let's look at FIG. 16, which features an event photo 700 that contains three individuals. Two of these people, who appear on the left 701 and in the center 702 appear to be identical twins wearing similar clothing. Recognition using facial metrics used in conjunction with recognition using proximate pattern metrics as previously described are not going to be able to effectively differentiate these individuals. However, one of the individuals 701 is wearing a pin 703 upon their shirt, whereas the other individual 702 does not have such a pin. Given this is the case, and given the pin itself can be successfully detected, and given the pin is not removed or traded back and forth between individuals upon posing for different photos, the individual on the left 701 and the one in the center 702 can receive their rightful photo galleries. Even in this edge case of an edge case, where a difference cannot be discerned by traditional facial, object and pattern recognition, the presence of such a distinct and detectable object can help to differentiate between two individuals and allow the recognition engine 126 and greater system 88 to perform successfully.

Example of Non-Biometric Recognition in Conjunction with Facial Recognition: Face Covering and Conditional Confidence Level Thresholds Based Upon Presence of Detected Object, in this Case, Masks.

FIG. 10 provides more granular detail for another special case of object detection 106 occurring alongside Face Detection 101, which is that of Mask Detection 107. While face coverings at themed special events such as Halloween events have long presented challenges for using recognition technologies to assemble personalized photo galleries, the global pandemic of 2020 brought such challenges to the forefront. Protective masks have literally masked the presence of a significant proportion of the identifiers within traditional biometric object models and the metrics used for not only comparisons between human faces but for face detection itself. The presence of a detected mask has proved to be valuable information that can assist a Recognition Engine 126 as it attempts to more effectively make match determinations. With such information accessible, more optimal numerical confidence matching thresholds can be conditionally applied from governing logic 105, resulting in more effective determination of matches when a portion of a photo subject's face may be covered in an image. If facial metrics 28 for a masked photo subject are being compared to facial metrics 28 of a non-masked face, the optimal numeric confidence matching threshold used for match determination by the Recognition Engine 126 would likely be different than what would be optimal if non-masked facial metrics 28 are being compared to other non-masked facial metrics 28 in the base case workflow previously described. For example, if the confidence matching threshold is set to 98 for normal picture matching between facial metrics in a detected object and those metrics of a relevant set of user facial metrics 28, when it is determined that a detected face 101 also contains a detected mask 107, the confidence threshold for matching may be dropped to a lower number such as perhaps 96, allowing more variance in what can qualify as a match.

Modifying Models to Accommodate for Masks; Modification of Single Base Model and the Expansion of Use of Multiple Models to be Associated with a Given User.

As an alternative approach, the model for one's facial metrics 28 may include only the component of a face that is likely to not be obstructed by a mask. Yet another approach would be to allow a given user in the database 13 to be associated with multiple models for facial metrics 28, to account for instances where a mask is present and where a mask is not. In these cases, the recognition engine 126 would be capable of making a match of a face in an image being processed whether it was determined to be a match with either of the facial metrics 28 associated with a given registered user within the databases 127. In yet another example, the color and/or patterns within a mask can by understood leveraging pattern detection 108 performed in conjunction with mask detection 107, enabling the recognition engine 126 to more effectively determine a match.

Recognition Engine's Role in Creating or Iterating Upon Object Models.

In addition to comparing metrics of objects to determine a match, the recognition engine 126 also has the components to create a new set of metrics for future matching. A given person can become registered, using subject identifiers 95 and any other relevant registration information which is committed to databases 13, with associated object and pattern metrics 102 to be logged by the recognition engine 126 as either facial metrics 28, non-biometric object and pattern metrics 103 or any combination thereof. In a similar way, a stored model in object and pattern metrics 102 need not forever remain in the same state; as more information becomes available, a model or the facial metrics 28 associated with a given user can updated and built upon.

In all circumstances, the effectiveness of the recognition engine 126 depends upon the quality of the models stored in object and pattern metrics 102 and/or the quality of the detected objects within a given processed image.

Facilitated Registration with User Consent

Referring to the figures, FIGS. 11B-11K highlight a streamlined privacy-focused method for enabling a user to opt-in to receive photos through the use of recognition. There are several variants to the ways in which this general flow takes place, but the method as a whole is unique in its simplicity and its high regard for privacy preferences. In a variety of streamlined ways, it allows the photo subject to provide informed written consent for their photo gallery to be generated through the use of recognition technologies. In contrast to the manual act of directly associating one's face with a subject identifier in order to initiate basic facial recognition, this flow takes a different approach by assembling all the necessary information required to conduct facial recognition, however holding off on the process of using recognition technologies until the relevant photo subject has given a form of informed written consent for doing so. In the descriptions that follow, a base case will be highlighted. While it isn't realistic to overview herein every permutation of the process, what follows will illustrate key use cases exhibiting slight differences to the flow based upon how and when photo detail annexation components 111 are used, as well as incorporating some other variables. Supplementary visuals will be included to further illustrate user experiences and potential applications of the described processes.

Base Case—Private Photo Delivery System

Figure 11A:
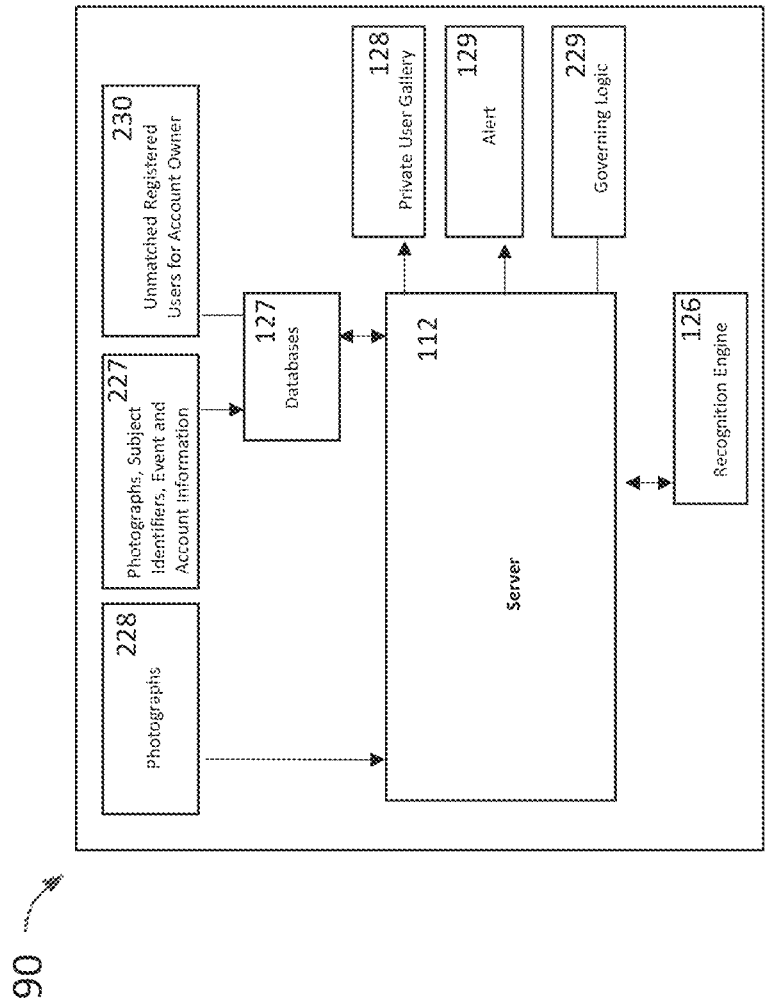
FIG. 11A is a schematic view of a photograph sharing process of an embodiment of the present invention, outlining the basic flow of photos through an automated private photo delivery system to individuals previously registered to receive such photos.

Referring to the Figures, FIG. 11A is a schematic illustrating a simple base case of photos flowing through the system 90 as an embodiment of the present invention. Photographs 228 are taken, perhaps at a social event such as a holiday party, and are then uploaded to a specified directory upon a server 112. The photos 228 can be uploaded to the server 112 using Wi-Fi, Bluetooth, ethernet or any other available means in real-time, near real-time or at any point after the photo file was created. The photos 228 can be in any digital format and can be sent directly from a camera memory card as a native digital file, or can be digital files rendered from scanned prints or slides. The photos can make their way to a specified directory on the server 112 and can be associated with a specified event on the server as a result of server linkages to governing logic 229 and to event information 227. Such linkages of governing logic 229 and event information 227 can also determine whether a given user that is already in a user database 127 would be eligible to be processed by the recognition engine 126 for a match within a designated set of event photos. Associated with a given user's record in the database 127 would be sufficient information to support processes by the recognition engine 126 in determining a match, in conjunction with pre-established confidence-level thresholds represented within governing logic 229. Upon determining a match, linkages between a given photo file and user record within the databases would be updated 127, resulting in the inclusion of that given photo within the associated private user gallery 128. Depending upon account or event settings 227 as well as governing logic 229, that photo subject may receive an alert 129 indicating an update has been made to their gallery 128. Finally, there is may be a set of unmatched registered users 230 that have yet to be matched within photographs 228 streaming into the Server 112.

Operator Facilitated Registration

Figure 11B:
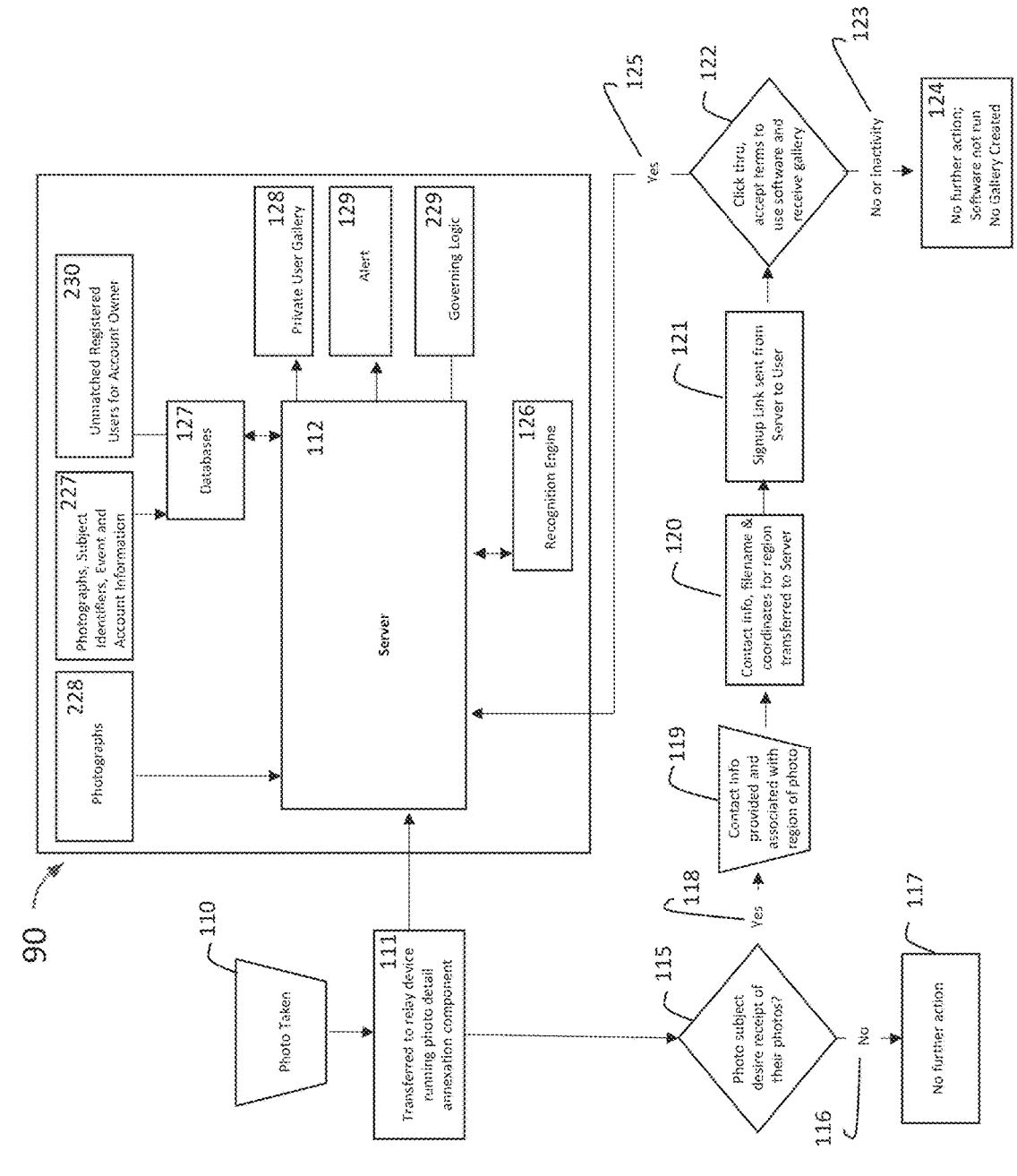
FIG. 11B is a schematic view of a photograph sharing process of an embodiment of the present invention outlining a streamlined privacy-focused method for user opt-in to using the photo delivery system facilitated by a photo detail annexation relay device.

While the flow within FIG. 11A outlines how previously registered individual would receive access to a photo or set of photos, FIG. 11B illustrates a base case in which an operator facilitates registration by engaging with a given photo subject to associate certain key details with a given photo file.

After a photo is taken 110, photo subjects can request that photos in which they appear be sent to them. Photos taken 110 are transferred to a relaying computer device such as a Smartphone, tablet or laptop which is running a photo detail annexation component 111. In contrast to the prior case, this flow features a relay device and photo detail annexation component that is being actively operated by the photographer or a supporting staff member who is facilitating registration for the photo sharing process.

The photo detail annexation component serves two purposes, the first being the relay of photos to a directory upon the server 112. Given the component requires login account credentials, and allows the operator to specify a given event with which to associate photos, any photos transferred to the server 112 will be associated with the relevant event, thanks to linkages between relevant event information 227 supplied to databases 127 accessible to the server 112.

The second purpose of the photo detail annexation component 111 is the logging and transferring of relevant details associated with a given photo 110 which can ultimately be used by the system 90 to create private galleries 128.

If the opportunity for a photo subject to receive their photos 115 is declined by a photo subject 116, then no further action is taken to facilitate delivery of that photo subject's photos to them 117. If, however, the opportunity to receive one's photos by providing contact information 115 to the operator is welcomed and pursued by the photo subject 118, the photo subject may provide contact information in the form of a unique subject identifier such as cell phone or email to the operator 119. The operator will use the photo detail annexation component 111 to associate such contact information with a specific region of the photo in which the photo subject appears 119. If someone is to in-fact be sent their own set of photos and not a set uniquely belonging to another photo subject, the operator will need to take care in associating the photo subject's information with the specific region of a photo belonging uniquely to the photo subject 119. This process is outlined in greater detail in FIG. 12, explained in the next section below.

Of note, the turnaround time of receipt by the photo subject of their gallery is dependent upon internet access; without sufficient capability to transfer photos to the processing server 112, there will be a delay in the process until a sufficient connection is used to transfer photos. However, assuming the presence of sufficient connection capabilities to the internet, the contact info and coordinates of a region of the photo are then transmitted to the server 120. The server 121, referencing the photo subject's now-provided contact information associated with a given image file, now on file within databases 127 uses its alert notification capabilities 129 to send a signup link 121 prompting that photo subject to proceed by first checking a box to accept terms of using the recognition and platform to privately deliver to the photo subject their respective photos 122. Illustrations of such prompts will be explained further below, referencing FIGS. 14 and 15. If the user doesn't provide such consent and opt to proceed 123, no further action is taken by the platform to facilitate the photo sharing process for this photo subject 124, and no further action is taken to make use of the coordinates associated with the given photo subject using the recognition engine 126. Furthermore, previously provided contact information and associated contextual information 120 which had been committed to the Server's 112 databases 127 may be purged after a certain amount of time, in accordance with governing logic 229.

If, however, the user chooses to proceed by providing informed written consent 125, the contact information and coordinates previously provided 120 combined with the original photo file sent to the server 112 are utilized by the Recognition Engine 126. A user account is created in the databases 127 and other matches may emerge within a designated set of photos that have already been uploaded to the server 112 and associated with a given event 227 stored within databases 127. Any such matches, as determined by the Recognition Engine 126 will be associated with a given user account within the databases 127 and populate within a personal gallery accessible by a private user link 128. Depending upon account or event settings 227 as well as governing logic 229, that photo subject may receive an alert 129 indicating an update has been made to their gallery 128.

As in the previously outlined case from 11A, the source of photos in FIG. 11B need not be limited by a single photographer or operator streaming photos 111, and additional photos 228 may also be routing to the server 112 to be processed in a similar fashion. Those attendees with user database records 127 that are eligible to be matched may be individuals who had created a user record during a given event by means of the photo detail annexation component 111 or can be eligible individuals with prior existing user records in the databases 127.

Illustration of Photo Detail Annexation Component

Figure 12:
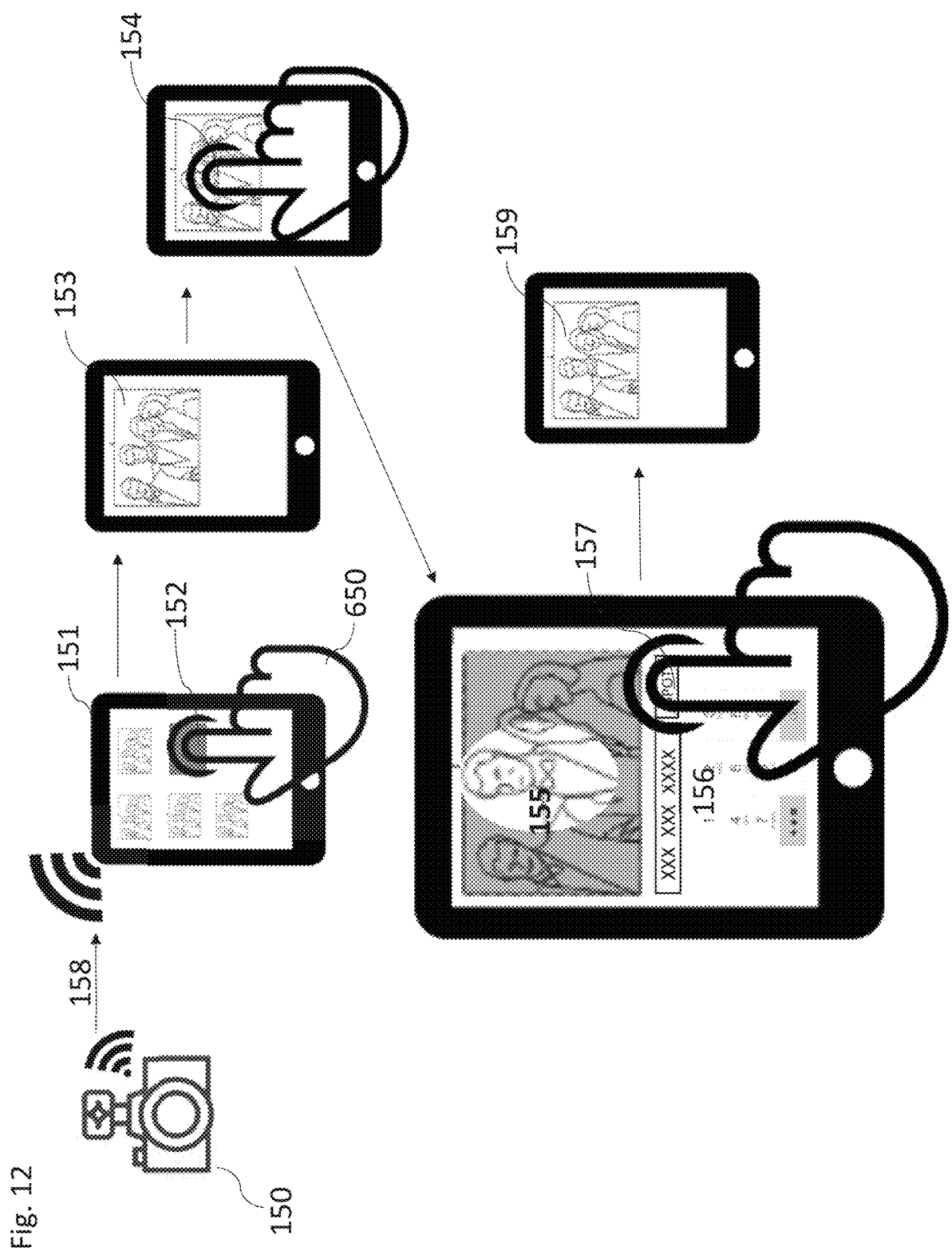
FIG. 12 illustrates an example of how the photo detail annexation component operates upon an input device.

An example of the Photo Detail Annexation Component 111 referenced within FIG. 11B is illustrated in greater detail from the operator perspective in FIG. 12. In FIG. 12, photos that are taken on a capture device 150 transfer wirelessly 158, wired, or by any other means to a computer device such as a tablet, smartphone or laptop that contains a photo detail annexation component 151. Once transferred, any photo files can be further relayed to a directory on the Server. When an operator 650, such as a photographer or supporting staff member selects a given photo that has streamed to the device 152, in this example the user interface responds to feature that photo in larger format 153 which is likely more suitable for further interaction by the operator. Prompted by a request of one of the photo subjects in this example, the operator can intentionally click upon a region of the photo clearly and uniquely belonging to this given photo subject 154. For the sake of illustration, in this case that associated area is featured with an off-color oval 155, but an indicator of the region to be associated with photo subject contact information can take many forms. Next, the operator can enter photo subject identifier information such as a phone number or email address 156 and upon proceeding—in this case by selecting the "spot" button 157—such information within the application is logged and earmarked for delivery to the server by any known transmission (wirelessly, wired, or other) 158. From the operator's perspective, at this point one individual has been processed and will receive a link to their phone number or email which enables them to receive access to their photo gallery, and the operator can move along to process a similar request by another photo subject. After associating the previous photo subject as described, the user interface of the photo detail annexation component 159 in this example returns to either a stream of active photos as was seen in the first illustration 151, or—as illustrated in this sequence—can return to what had been the previous screen 153, in which the facilitated photo sharing process can continue for other photo subjects. This streamlined process of associating multiple people rapidly and effectively is detailed in greater extent below and through supporting FIG. 13. In FIG. 12, the last action of associating photo subject identifier information with a region of the photo 157 maps to what in FIG. 11B is the transfer of contact information, filename and coordinates of a region of the photo to the system, in turn resulting in a signup link being sent to the photo subject 121, who will have the opportunity to click through acceptance terms 122 to proceed with using the recognition engine 126 and photo delivery system 90 ultimately resulting in receipt of a private photo gallery 128 as detailed in preceding workflows. As is illustrated in FIG. 11B, should the individual receiving a signup link and not actively proceed 123, no further action is taken by the platform or recognition engine 126 to process such photos 124.

Figure 13:
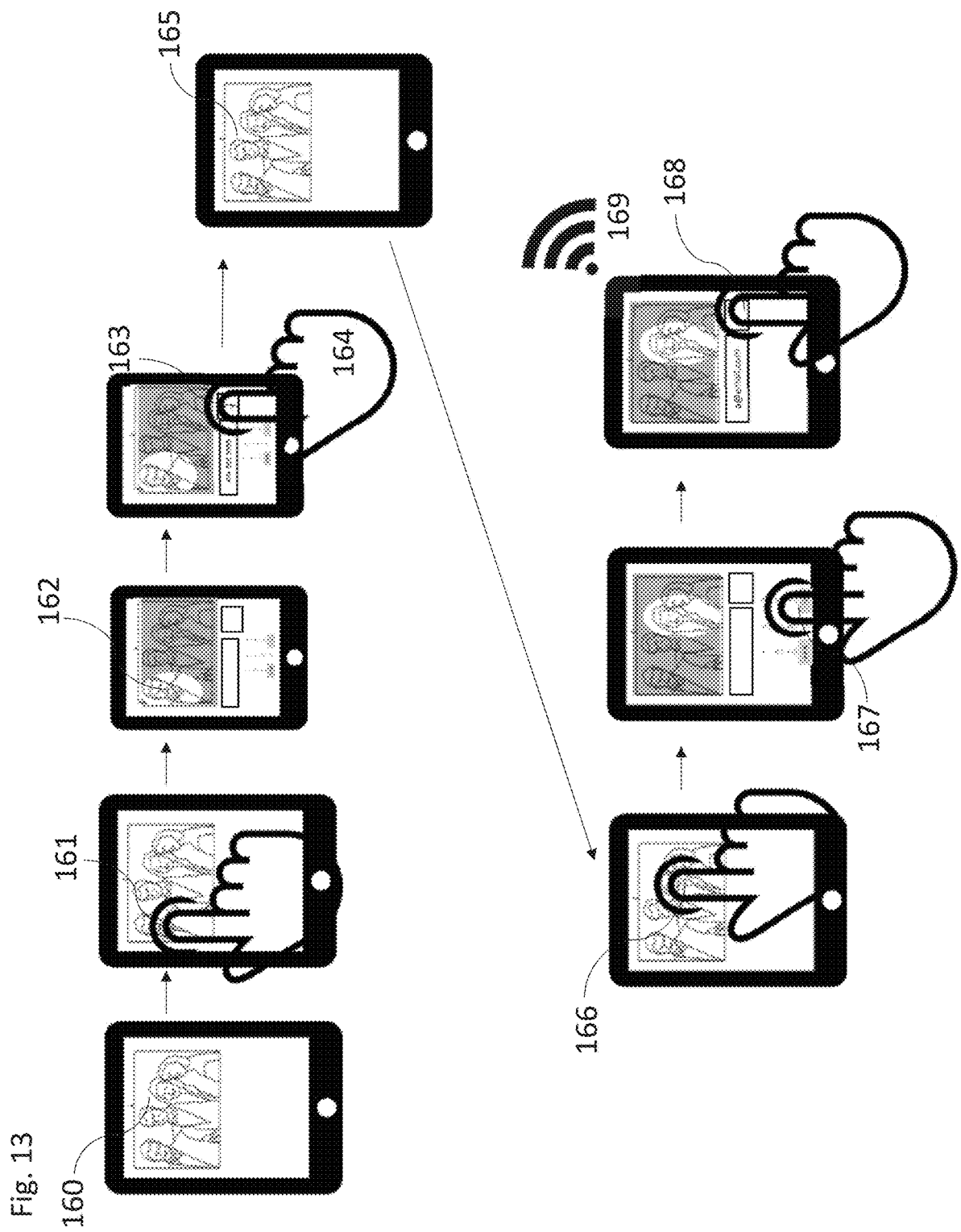
FIG. 13 showcases an example of an expansion of the functionality of the photo detail annexation component, illustrating a streamlined method of registering multiple people with a given photo.

Annexation Component—Rapid and Accurate Accommodation of Multiple Individuals for Registration FIG. 13 illustrates that the user interface of the Photo Detail Annexation Component can accommodate cases where multiple individuals in a given photo can receive photos by means of a streamlined signup process. FIG. 13 picks up on the exact same point 160 where FIG. 12 had left off 159, and again provides an example and use case for illustrative purposes. While in the previous photo detail annexation sequence outlined in FIG. 12, the second person from the left had been registered 155, FIG. 13 uses the same image and moves along to help other photo subjects featured within this image who desire receiving access to their photo galleries as well. By clicking on a region associated with another person, in this case the first person from left to right 161, once again a designated region of a photo can be associated with the subject identifier information for the respective photo subject 162. Upon submitting such information 163, the Photo Detail Annexation Component operator 164 can move along and seamlessly set up another person for registration 165, seen in this screen identical to the first in this sequence 160. This process can continue to play out as the operator selects yet another person featured in this photo 166, in this case the third person in the sequence from left to right. Once again, the operator can enter associated contact information 167 and after doing so, log such information to the application 168, effectively passing such details along to the server as in each of the prior cases. As was seen in FIG. 12, an operator can also easily navigate to other photos 151 to efficiently and effectively facilitate the registration process for different interactions with photo subjects who may also desire access to their images. Of course, the benefit of this system as a whole is that subject identifier information need only be provided one time, whereas other facilitated private photo sharing services and systems generally require the manual sharing of a photo or sets of photos with each interaction.

Regard for Privacy

In FIG. 11B with extreme regard for privacy preferences, the operator of photo detail annexation software 111 by design would ideally be receiving contact information directly from the photo subject and not from others. Nevertheless, it is possible that friends, family or associates of the photo subject may provide that photo subject's contact information 119. Even in this case, one's privacy preferences continue to be held in high regard as filling out the signup link 121, a mandatory step prior to initiating processes resulting in receiving one's gallery 128, serves as a verification process; under the assumption that a photo subject maintains control over access to their phone or messaging clients, no one else should be able to opt-in on their behalf 125 using both their likeness and contact information. Time limits can be set at the platform, account, company and/or user level and administered by governing logic 229, which can control how long data remains within the databases 127. This can pertain to any of the information sent to the server 120 initially earmarked for processing upon receiving user consent 122 which did not receive such consent 123, within a timeframe set within governing logic 229. Any other user data can be scheduled to be purged after a set duration of time as well, including data such as any photographs and subject identifiers 227 along with any other references elsewhere within the system 90.

Figure 14:
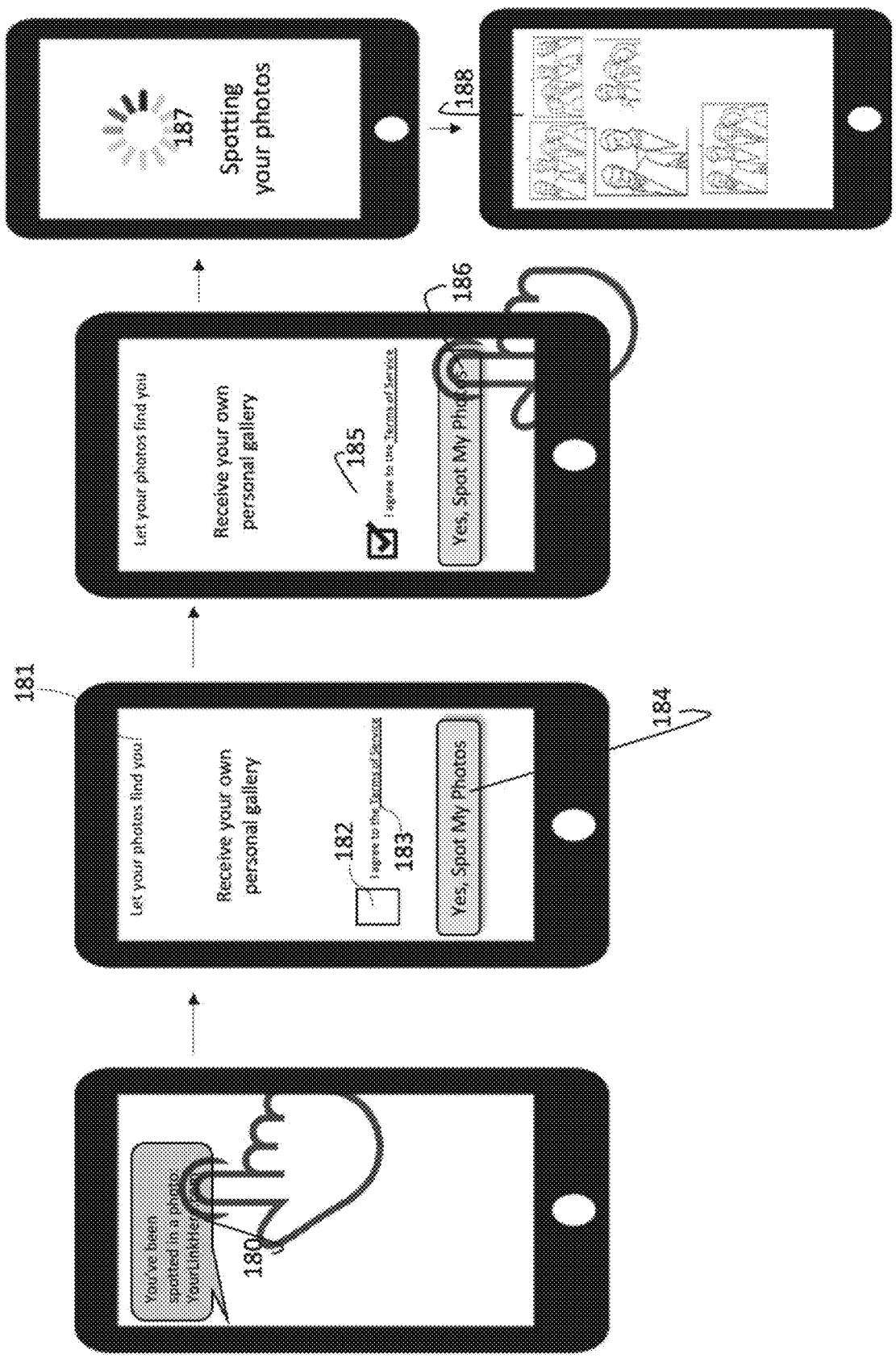
FIG. 14 illustrates the user experience of receiving an alert in accord with an embodiment of the present invention, followed by the steps for providing consent to complete registration and enable use of the system to return one's private gallery.
Figure 15:
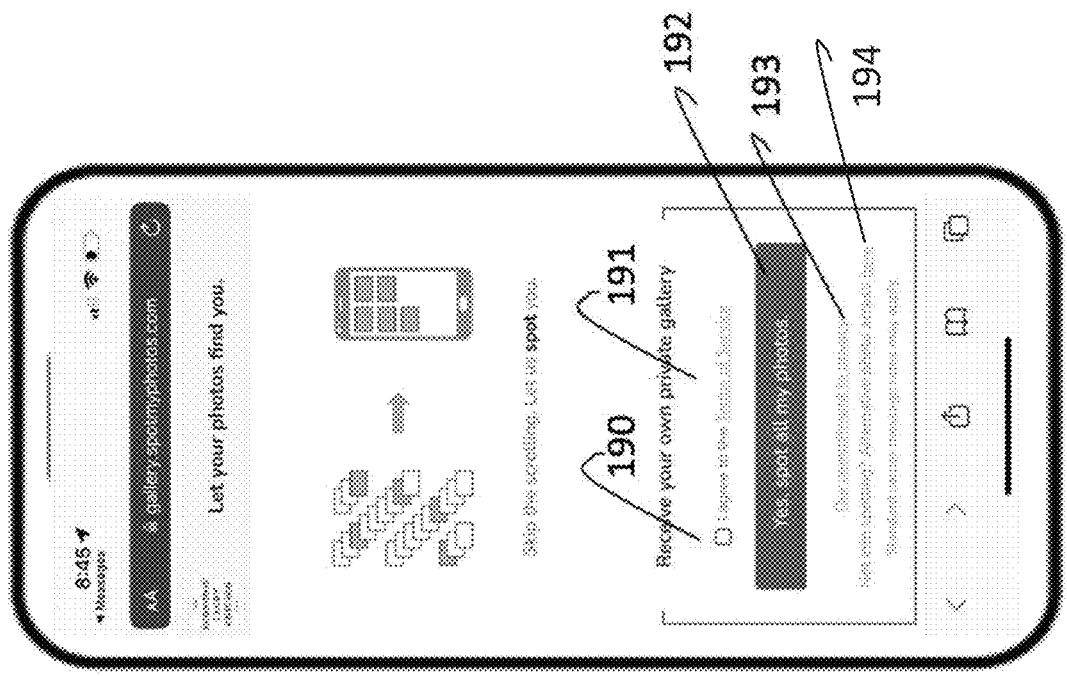
FIG. 15 illustrates an example of the primary landing page a user would encounter upon clicking through on an alert in accord with an embodiment of the present invention.

Photo Subject's Interaction with Server to Proceed with Terms and Processes to Ultimately Receive Access to Gallery FIG. 11B is supported by a few sets of visuals which help to illustrate how individuals might interact with the system 90. FIGS. 12 and 13 covered the user interface for the operator for what FIG. 11B refers to as the Photo Detail Annexation Component 111. FIGS. 14 and 15 showcase what a given photo subject from FIG. 11B might experience after requesting access to their photos 118 and receiving a signup link 121. In FIG. 14, a user has received a signup link 180, in this case through a text message but could easily be through an email, messaging service or take other forms.

Upon clicking the link, the photo subject would arrive at an interface affirming their desire to receive photos 181. In this illustration, this interface features an empty check box 182 for agreeing to hyperlink-accessible terms of service 183, followed by a button for proceeding to process photos 184. This is just one example where the aim is to solicit and receive informed written consent in digital form for processing one's photos using the workflow previously outlined in FIG. 18. Checkbox checked 185, and button to proceed clicked 186, one has completed their steps requesting access to their photos. In the case real-time sharing is enabled, that user may see some feedback on the searching process 187 and then be served their gallery through the device they are using 188. In the case of a temporal delay, as illustrated in FIG. 11B, access to that gallery may come later and may be accompanied by an alert 129. Upon providing consent and completing the registration process, future interactions with one's gallery can be direct, and referring to FIG. 14, can advance directly from the clicking of an alert link 180 to access of one's gallery 188.

Another example of the interface allowing one to enroll with consent can be seen in FIG. 15. This again showcases the elements of a checkbox 190, accessible terms 191, in this case additional contextual information including a privacy commitment 193 is also provided by the operator of the service, and again a button to purposefully proceed 192. Additionally, for those who may for any reason prefer to bypass the use of the recognition engine, this example reflects an accommodation 194 which could serve up a single reference image or a note to the operator expressing an interest in receiving photo delivery by other manual means.

Figure 11C:
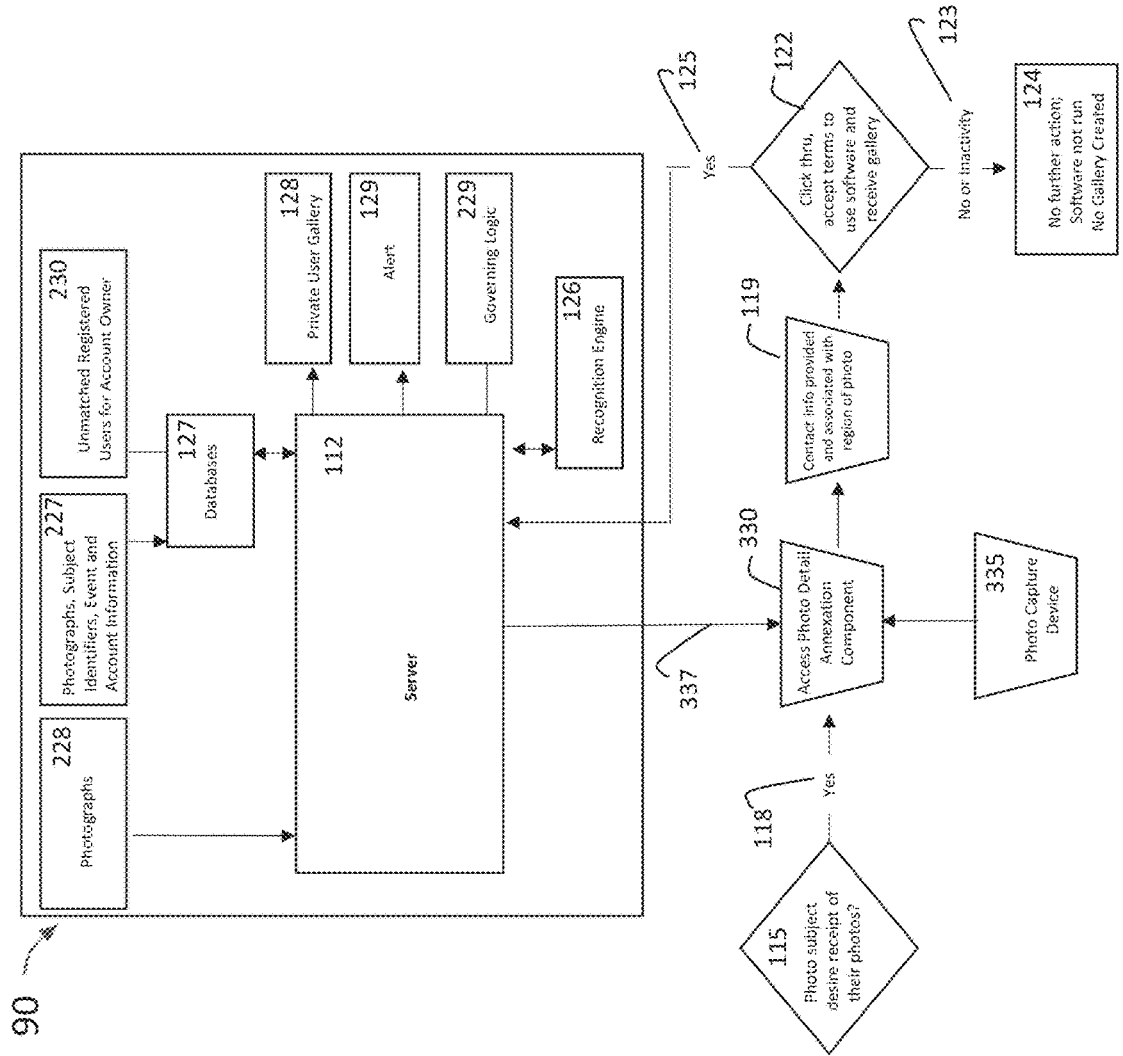
FIG. 11C is a schematic view outlining a user self-registration process within an embodiment of the present invention, utilizing an event's official set of photos as registration content.

Self-Serve Kiosk or Other Computing Device Serving as Photo Detail Annexation Component—Registration by Event Photo Stream Content In a derivation of these flows, now referring to FIG. 11C, a variety of devices—such as a tablet, laptop, photo booth installation or even one's own Smartphone or computing device—can facilitate the sharing process. This can replace the need to have a staffed operator. In this case, the photo annexation component would access photos from either a connected capture device 335 and/or other photos 228 making their way through a connection 337 (wired, wirelessly and/or other) between the photo detail annexation component 330 and the server 112. In these cases, the photo detail annexation component 330 would associate event information 227 with photos leveraging governing logic 229 and databases 127 all connected through the server 112. If after a being presented the opportunity to receive one's photos 115, a photo subject desires their photo be sent to them 118, the photo subject would access the photo detail annexation component 330, provide contact information and a region of the photo with which to associate such contact information 119. While at this point information could be sent to the server triggering an alert to provide consent as had been the case in past flows, in 11C, still interacting with the photo detail annexation component 330 one can be prompted for informed written consent 122. If one doesn't proceed 123—and given the photo subject hasn't given prior consent resulting in the creation of an eligible user record in the databases 127, then no further action will take place 124. If, however, one does proceed with granting consent 125 such information is relayed to the server 112 in a process that is slightly more streamlined relative to 11B; as seen in FIG. 11C the process can immediately commence utilizing the recognition engine 126 to initiate the set of processes once again resulting in one receiving access to their own photo gallery 128. In sum, this workflow gives an individual photo subject the ability to initiate the process of enrolling themselves.

Self-Registration Using Content Independent of an Event's Photo Stream

In some of the previous cases outlined, photo subjects were able to more independently complete the steps of registering to receive their photo gallery by leveraging photo content from an event's official photo stream, presumably by event photographers or other designated capture devices.

Self-Registration: Base Case for Receiving One's Gallery

Figure 11D:
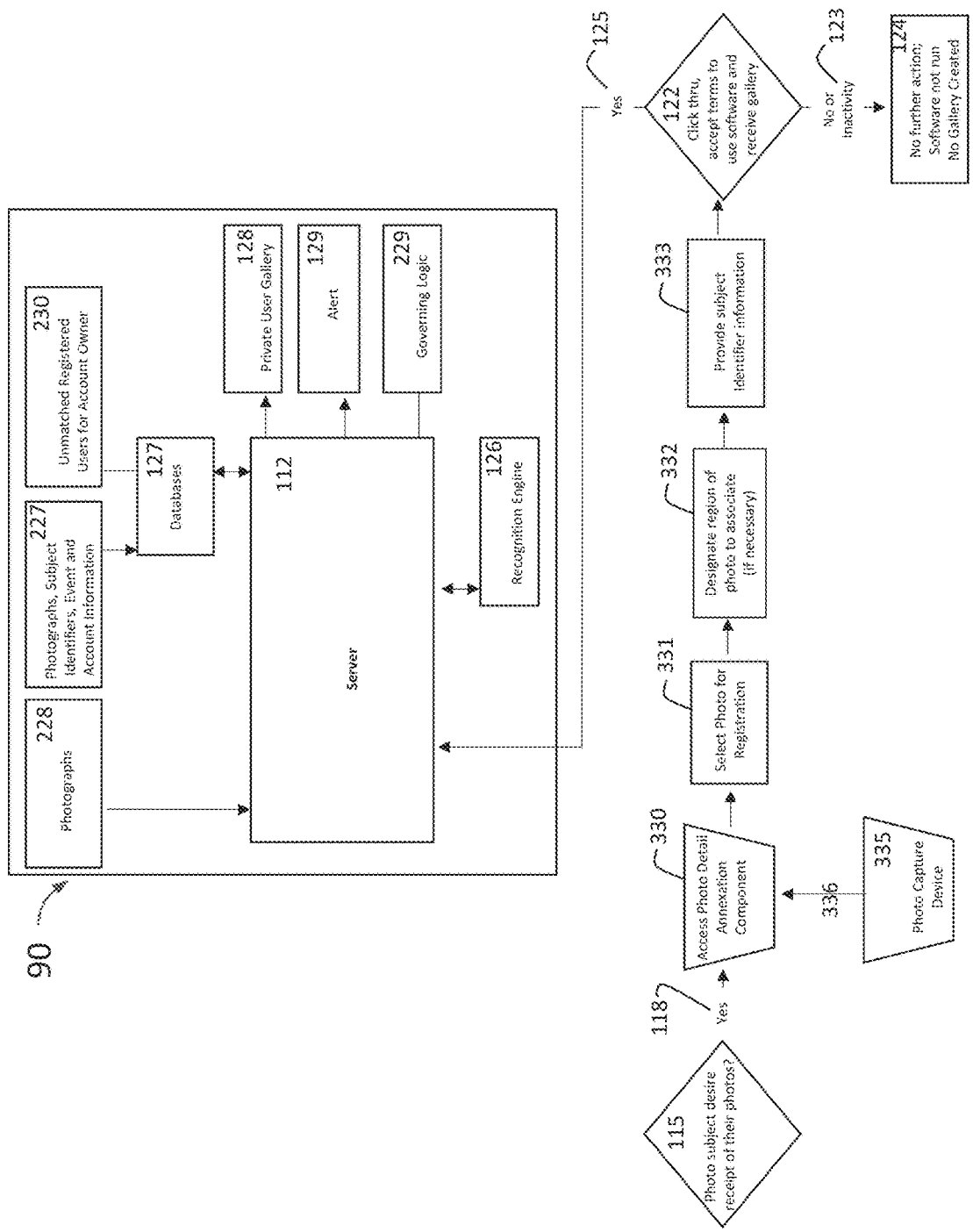
FIG. 11D is a schematic view outlining a user-self-registration process within an embodiment of the present invention, utilizing photo content independent of an event's official set of photos for the purpose of registration.

In a basic flow, resembling self-registration using a kiosk or one's own device utilizing an official set of event photos, a simple derivation can occur in the form of the source of the photo content being used to register a user. In FIG. 11D, one who has been or intends to be a photo subject at a given event can, upon recognizing the opportunity to participate and receive one's photos 115, affirm their intention 118 by accessing a photo detail annexation component 330, which either in real-time or at a later point can be connected via transmission 337 to the server 112, so as to associate any information sent to the server with a specified event 227. This component can be accessed from one's own phone, a tablet, photo booth kiosk or any other device which can effectively be connected to a capture device 335, whether built into that device or otherwise connected. Next, the photo subject would either take a photo of themselves using a connected capture device 335 or access an existing photo accessible to the photo detail annexation component 330 and select a photo to use for the purpose of registration 331. The photo subject would then designate a region of the photo unique to that individual which they intend to associate 332. The photo subject would also provide their contact information, serving as subject identifier information 333. Upon being prompted to provide consent 122, and then upon granting such consent 125, a photo subject is effectively registered and can yield the same result leveraging the system 90 to receive access to a private user gallery 128, delivered by notification alert 129. In such a way, individual photo subjects can initiate the process of enrolling themselves independent of an event's designated set of photos. Based upon governing logic 229, the submitted registration image photo may not be eligible to be shared with others or appear within one's user gallery 128.

Figure 11E:
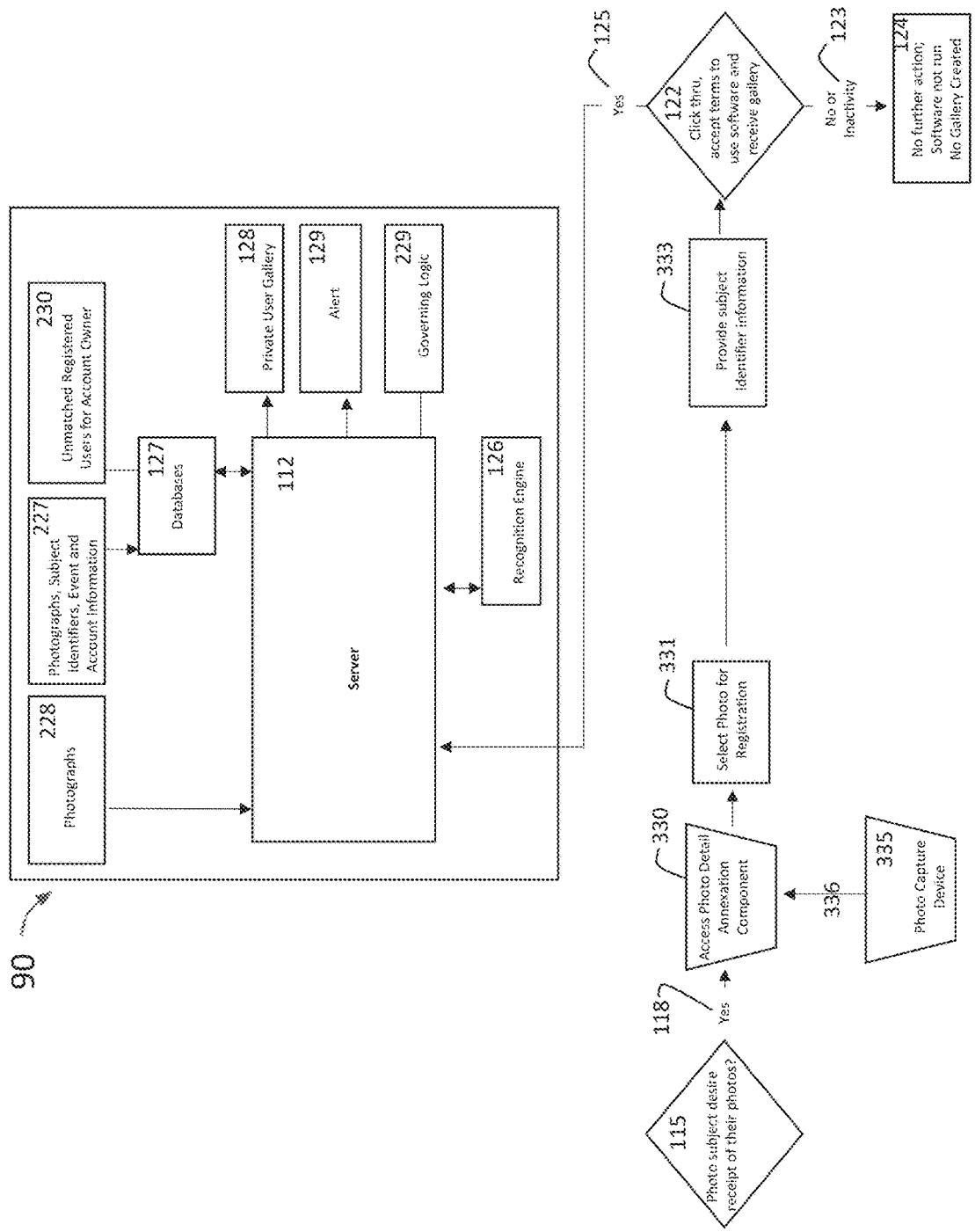
FIG. 11E is a schematic view outlining a user-self-registration process within an embodiment of the present invention, utilizing photo content independent of an event's official set of photos for the purpose of registration, and without requiring a registering user or other operator to designate an associated region of a photo.

Self-Registration to Receive One's Gallery with Special and More Automated Case of not Needing to Identify Region for Association Referring now to FIG. 11E, in a nearly identical flow as outlined previously in FIG. 11D, upon providing a photo of oneself, there is no need for the photo subject to associate a region of the photo 332 as such information can be determined automatically; that is, a user can go from selecting a photo for registration 331 directly to the step of providing subject identifier information 333, as is seen in FIG. 11E. Referring to FIG. 10, if face detection 101 returns what can be understood by the Recognition engine 126 as a single primary detected face, then with the assistance of governing logic 105, by default the facial metrics for that single face 28 or object and/or pattern metrics detected in proximity to that single face 103 can be associated with the given photo subject in the database 13. Given the absence of what in FIG. 11D is the designation of a region of a photo to be associated 332, all other processes remain the same for FIG. 11E, resulting in the creation of one's personal photo gallery 128.

Figure 11F:
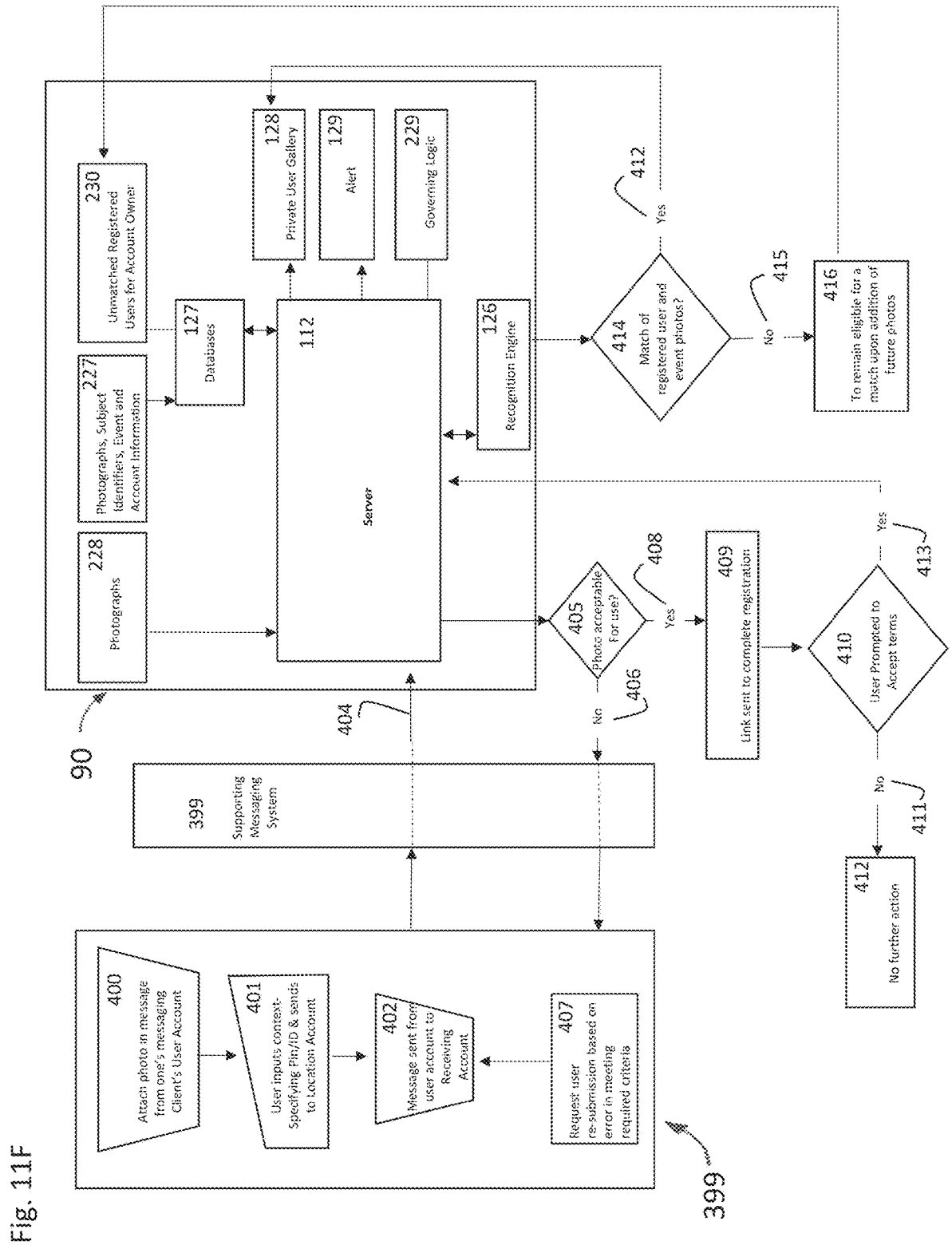
FIG. 11F is a schematic view outlining a user-self-registration process within an embodiment of the present invention, utilizing photo content independent of an event's official set of photos for the purpose of registration, and using a messaging platform as the photo detail annexation component.

Self-Registration by Means of Messaging Client and Independent of Photo Detail Annexation Interface Referring to FIG. 11F, while some of the above methods for self-registration have made use of photo detail annexation components that have been exemplified with supporting user interfaces, it is worth noting that such interface is not necessary. There are special use cases where a messaging client itself, such as a phone, email account or chat account can route basic supporting information needed in order to effectively accomplish the objective of registration. FIG. 11F showcases how one who either is a photo subject or intends to be, can self-register directly through email, a text message or chat client. Presumably, clear registration instructions would be provided by someone associated with a given event, and publicized in advance, during and/or after an event to potential photo subjects through any form of communication. Key components of instructions would include specifying a channel for sending a message (e-mail, text, mms, or chat) 399 with an attachment of a photo featuring oneself 400 along with some sort of context-specifying pin number or ID (event-ID, organization-ID, Photographer-ID, or Device-ID) 401 to a provided address/account (email, phone number, short-code or messenger application ID) 402 on a messaging client 399 able to interface with the server 112.

In this case, a user would essentially be registering oneself without manually providing the subject-identifier, as in FIG. 11F the subject identifier would by default be embedded within the message itself in the form of the send-from address (an email address, phone number, Messenger/Chat user-ID) 400. This address, after processing in much the same way as previous workflows, would conveniently later serve as the return address for sending alert notifications 129 with messages which may include links with access to one's private user Gallery 128.

Upon submitting a registration request with required information 402, the messaging client 399 serving as the gateway for transmitting the information 404 would effectively hand off the photo, subject identifier and context-specifying ID 401 to the server 112.

Once the message is received by the server 112, a validation process supported by governing logic 229 would determine if the information provided is suitable for further processing 405, checking the validity of both the context-specifying information 401 the suitability of the photo itself and potentially even the suitability of the send-from address as determined by governing logic 229. If any such information is not deemed to not be acceptable 406, the supporting messaging client 399 can again serve as a gateway for communication this time delivering a message to the registering user requesting resubmission and specifying the cause of a registration error 407 based upon governing logic 229. If the user decides to resubmit, they can again follow the same path as previously specified ultimately sending a new message through the supporting messaging client 399 to the server, hopefully passing the validation process 405. If registration during the first attempt or any attempt thereafter is successful, passing the validation process 408, a link can be sent to complete registration 409, where the user would be prompted to accept terms 410 to continue. If the user doesn't accept terms 411, no further action would take place 412, and such submitted information may be purged from the system 90 in accordance with governing logic 229. Assuming one responds favorably to the prompt 410 and with a form of consent chooses to proceed 413, such action can be logged by the server 112, triggering the recognition engine 126, resulting in the distribution of any matched photos in the form of a gallery 128 back to the subject-identifier (an email address, phone number, Messenger/Chat user-ID) associated with the send-from inbound request address 402 facilitated through the supporting messaging client 399 and interaction with the server 112. The recognition engine 126 will determine whether there are matches between registration information and event photos 414, with the help of a variety of supporting components connected through the server 112, previously outlined in greater detail. If it is determined that there are no current matched photos 415, such registration information can remain eligible for future matches 416, stored within databases 127 connected to the server 112, specifically designated for unmatched registered users 230. A future match could be determined, and the associated photo subject could be alerted 129 with their private gallery 128 using the same general workflow previously outlined.

Based upon governing logic 229 of the event settings or account settings 227, provided information designated to be unmatched 230, or information associated with user accounts that are matched 127 may be removed from the system 90 after a specified amount of time.

This example of registration by messaging client 399 is well suited for texting, where people send a text/mms to a provided phone number or short-code attaching their image and including some context-specifying information. The same example conveniently works for messaging platforms 399 such as WhatsApp, WeChat, Facebook messenger or others which feature APIs or other pathways allowing for integration and cooperation 404 with the server 112.

In these cases, a simple photo of oneself can be sent along with a context-specifying ID which helps to pinpoint a given set of event photos in which to search. The result can be registration and then potential matching with other photos, which can be delivered back to the messenger account which had sent the first request.

Self-Registration by Photo Content Independent of Event Photos, without User Input of an Event-Level Association; Special Case: Unique Location Send-to Addresses for Each Event In FIG. 11G, the same workflow applies, however early in the workflow the FIG. 11G step of a photo subject providing some sort of context-specifying Event pin number or ID (event-ID) 401 is omitted in 11G. Just as the user subject identifier in 11G is embedded within the send-from address requesting registration 400, in a similar fashion, the sent-to address (location/account in form of designated email, phone number, short-code or messenger application ID) 402 furnished in association with an event can be tied specifically to a given EventID through the databases 127 connected to the server 112. In such a way, the process for the registering photo subject can be streamlined one step further. However, as trade-off for this shortcut to users, for the sponsoring event organizer, photographer or stakeholder, this is logistically one more step. The organizer, photographer or operating stakeholder will need to use unique send-to addresses 402 for each event where this method is used. Therefore, materials, templates and signage cannot be reused without making appropriate changes communicating event-unique send-to addresses.

Special Case: Recursive Search Approach for Determining Event-Level Association of a Registration Request In yet another variant, illustrated in FIG. 11H, the same general workflow applies, but in this case governing logic 229 is relied upon to a greater extent to further streamline the process for the photo subject and operator. In other words, the registration process for users can be simplified by not having to provide an Event ID in their registration process, and sponsoring event organizer or photographer can also retain the much easier approach of using a single send-to address (location/account in form of designated email, phone number, short-code or messenger application ID) versus creating unique send-to addresses for each event as in the previous case with FIG. 11G.

Figure 11G:
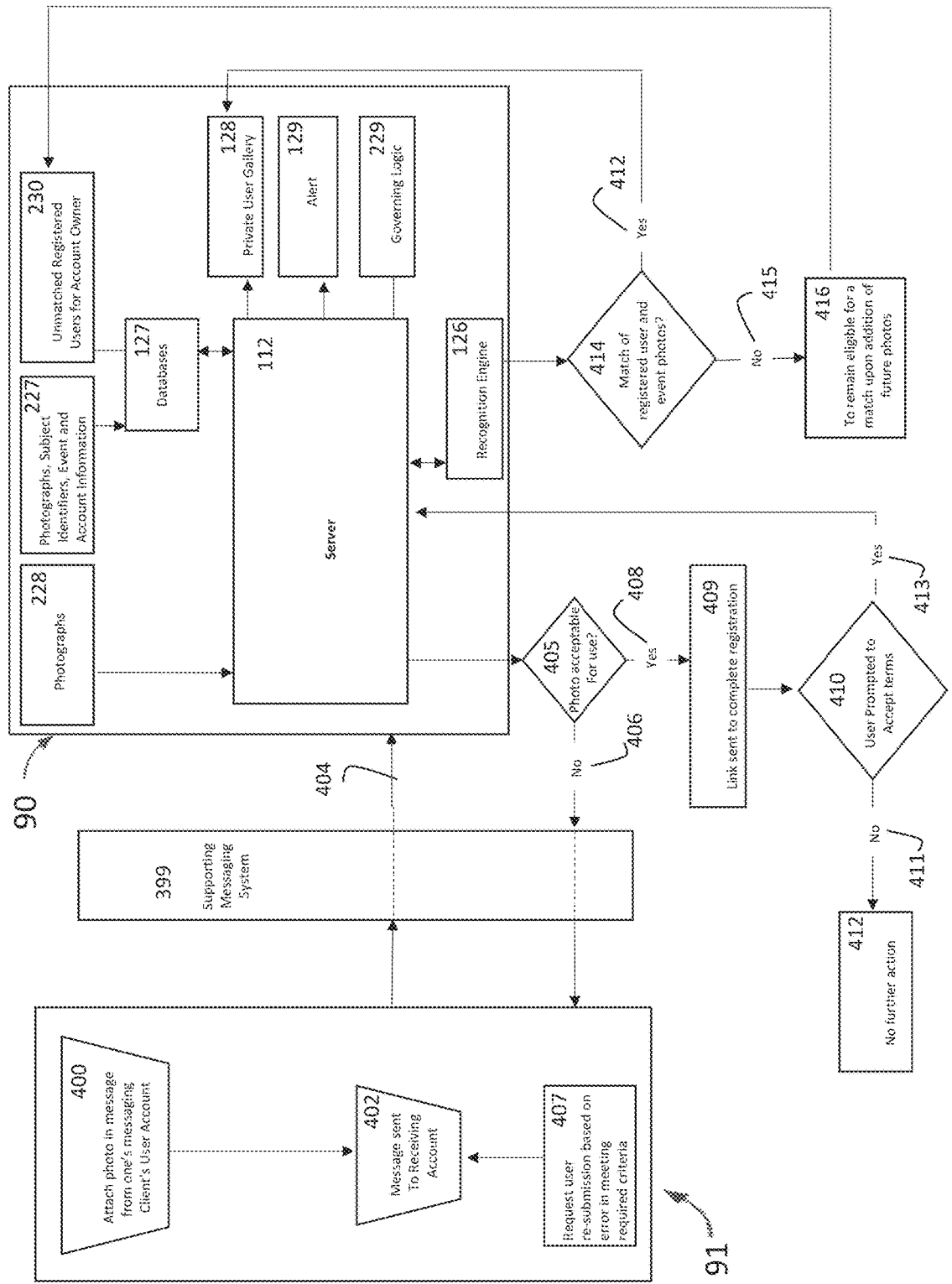
FIG. 11G is a schematic view outlining a user-self-registration process within an embodiment of the present invention, utilizing photo content independent of an event's official set of photos for the purpose of registration, and using a messaging platform as the photo detail annexation component, and without prompting users to provide any associated context-specifying event Information.
Figure 11J:
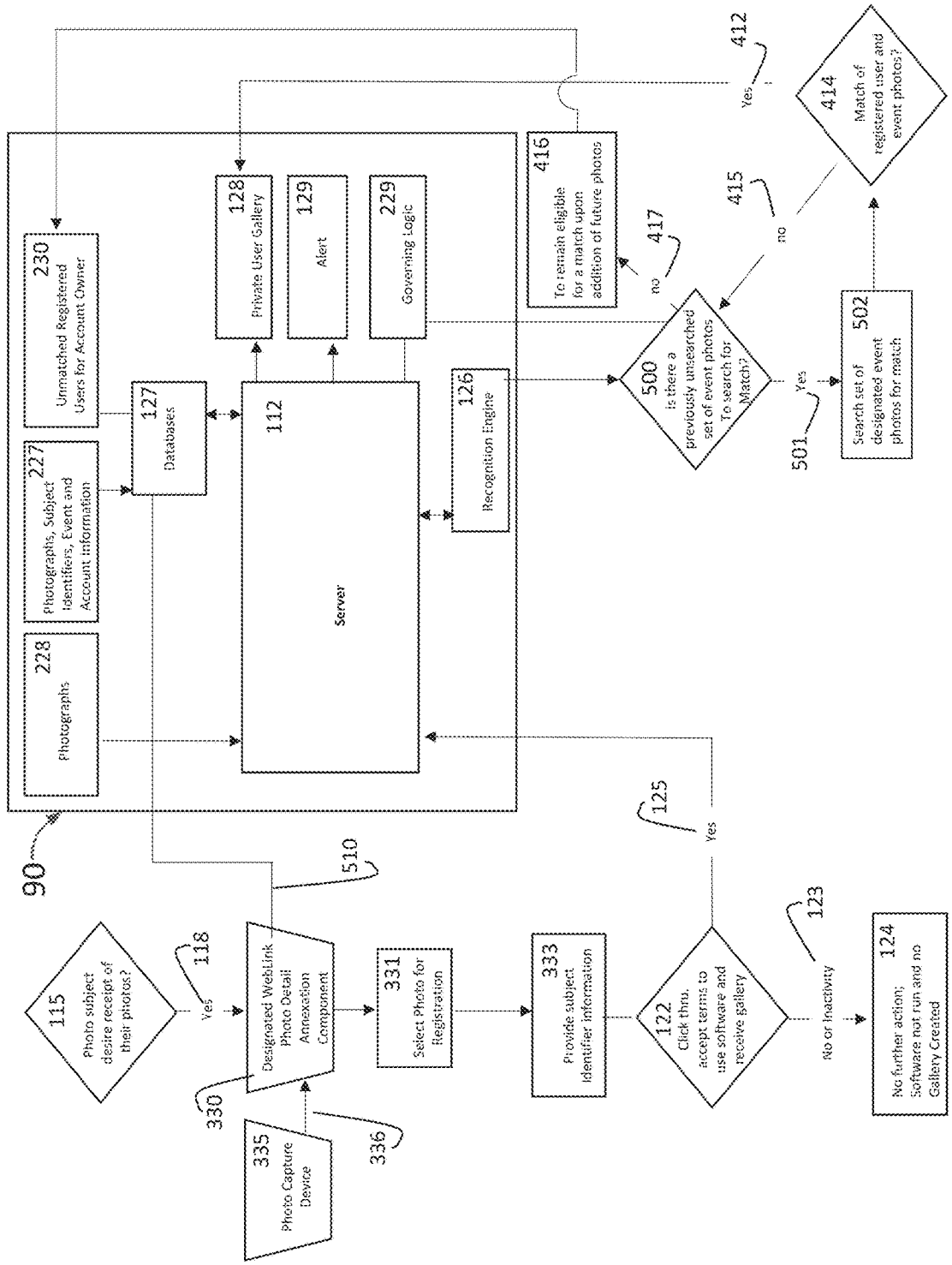
FIG. 11J is a schematic view outlining a user-self-registration process within an embodiment of the present invention, utilizing photo content independent of an event's official set of photos for the purpose of registration, and making use of an associated operator account-holder identifier associated with a designated weblink, and determining event-level association by means of a recursive search process.

Within FIG. 11H, the registration steps 400 and 402 remain the same as in the case of FIG. 11G, but without having to account for linking numerous send-to location/accounts to each Event ID in the databases 127. Instead, as in the case of FIG. 11G, a single location account can be used in FIG. 11H for each event by an organization or supporting photographer any time they host an event. The difference lies in a recursive search mechanism connected to the recognition engine 126.

Walking through the workflow for FIG. 11H, attention can be drawn to where a photo subject has affirmed their intent to proceed with the terms of the service 413, signaling to the server 112 the next step of utilizing the recognition engine 126. Because no context-specifying information is present to provide linkage to a given event, the recognition engine 126 will need the support of governing logic 229 to determine which sets of event photos from databases 127 the recognition engine 126 should be searching through. In this case, the location/address which serves as the destination used by individuals to register, will map to a corresponding account of an operator or account owner within the databases 127, for use at all of their events where they use the system 90. As a result of this circumstance, governing logic 229 will determine a hierarchy of relevant galleries linked to that parent account within the databases 127 to search within based on a variety of factors. Before beginning the process of a search through sets of event photos to find a match, the question posed in governing logic 229 will be 'Is there a previously unsearched set of event photos within which to search for a match for this individual?' 500. If governing logic 229 determines that yes 501, there is a set to search through based on linkages to the databases 127, it will route the recognition engine 126 to a specific set of event photos by its determination that is most likely to retain a match 502. The process will then be run by the recognition engine 126 to determine if there is a match 414 within that set of photos. If a match is found 412, the system 90 will continue as in past workflows, ultimately furnishing a personal photo gallery 128 to the photo subject as previously described. However, if no match is made at that point 415, the governing logic 229 will once again pose and answer the same question about eligible sets of event photos in which to search 500 and assuming there is another eligible set 501, will direct to the recognition engine 126 to the next most likely set of event photos in which to search for a match linked to the databases for a given account 127. Until there is a match, the cycle will continue searching through potential sets of photos until it exhausts all potentially relevant event photo sets. The path for a positive match 412 at any point in this search process will follow the path previously outlined. If all potential sets of event photos within the databases 127 are exhausted as per the support of governing logic 229 without returning a match 417 then the registration details will be stored as unmatched registered user details for a given account holder 230, eligible to be spotted upon the addition of any photos to a given gallery in the future 416. After a set amount of time has elapsed where one who registered has not been matched in a relevant set of event photos, governing logic 229 may make such registration information ineligible to be spotted and/or purge such information from the system 90, in accordance with privacy settings or any other reason.

Special Case: Use of Gleaned Location-Based Information to Determine Event-Level Association for a Registration Request In yet another variant of FIG. 11H, governing logic 229 can look for clues that help to determine linkage between photo files and events in the databases 127, once again powering its way through use of the recognition engine 126 without the step of furnishing context-specifying eventID information. If location information can be gleaned from a registration photo 400 itself or the digital footprints left by the registering photo subject through the use of their own device and associated networks in the registration process, governing logic 229 may be able to make the determination as to which set of event photos may be most relevant to look for matches. In cases where the exact location cannot be determined, some information may be useful to assist governing logic in prioritizing certain sets of event photos for efficient use of the recursive search process illustrated in FIG. 11H.

Of note, there are many permutations to these workflows. For illustrative purposes many have been outlined. One hybrid that is uniquely elegant is that of self-registration for a photo subject, through accessing a registration link.

Event-Level Association Passed Along within Unique Self-Registration Weblink for Each Event In this embodiment, the designated registration link can be unique for each event, mapping to designated EventID, as is seen in FIG. 11I. Here the photo subject can access a photo detail annexation component 330 through a weblink which is already mapping to a specific EventID 227 stored in the databases 127. With this in place, the recognition engine 126 will be able to execute processes in accordance with past workflows where a given registered user can potentially be matched with a given set of event photos. However, this may present a logistical challenge for the photographer or event organizer in generating a unique link for each event; aside from being just one more step in their operational process, one may be more limited in the re-use of past communication materials directing participants on how to register to receive photos.

Basic Flow with Registration Facilitated by Staff Member and Relay Device; Special Case of Obfuscation Engine as BIPA-Friendly Method for Using Recognition Engine In this embodiment, illustrated in FIG. 11L the method uses an obfuscation engine 130.

Special Case Facilitated Self-Registration: The Sharing on an Individual Basis of Event-Level Associated Self-Registration Weblinks by an Operator One method which can make this approach particularly efficient and effective occurs when a photographer or staff member can once again function as the operator as in FIGS. 12 and 13, but by disseminating links to those interested in receiving their photos allowing those individuals to self-register instead of taking a more hands-on approach to facilitating the process.

Figure 19:
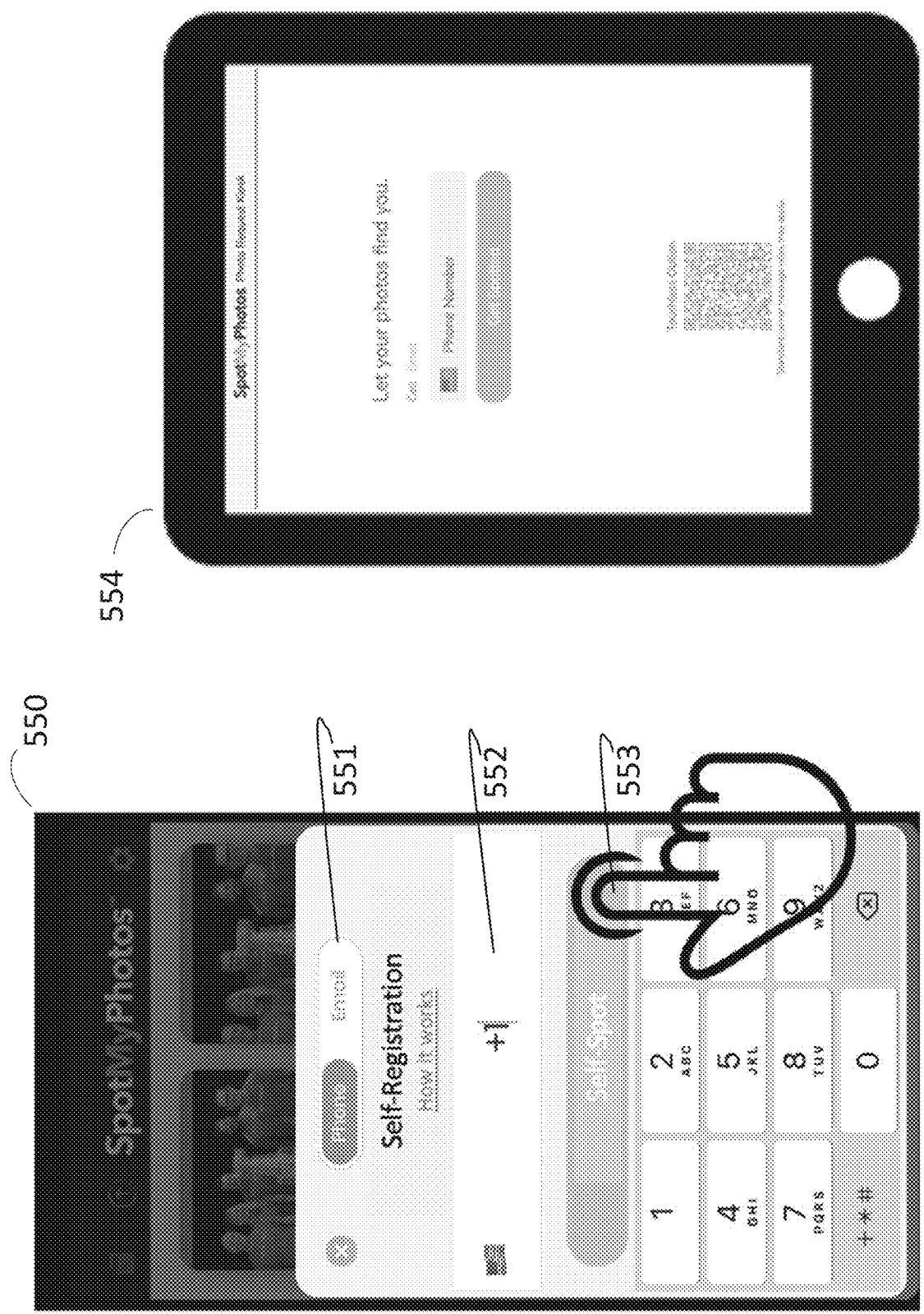
FIG. 19 illustrates how a message could be sent to an attendee's device, which would allow them to self-register, using authentic event photos or photo content independent of event photo stream content for the purpose of registration, in accord with an embodiment of the present invention.

Showcased in FIG. 19 is a screenshot of an application 550 which enables an operator or event attendee to easily send a link allowing an individual to self-register. The link can have event-level information embedded and direct a recipient to what in FIG. 11I is the photo detail annexation component 330. In this example the link appears set to go to someone's phone number 552, however an operator could foreseeably send to an email address or really any messaging client address 551, by entering that address and then, in this case, clicking submit 553. This embodiment could also lend itself well to a kiosk interface 554, and in addition to allowing self-registration using photo content independent of event photos, it is foreseeable that such interfaces could support sharing the set of event photos, or event a more relevant subset based upon timestamps, following a flow similar to FIG. 11C.

Either of these interfaces and methods illustrated in FIG. 19 can be used as a primary method for onboarding photo subjects, or in conjunction with any of the above methods or creative variations therein. In practice, these methods are arguably best used by a photographer or operator looking to provide personal touch to more efficiently register large numbers of individuals. By outsourcing to those individuals the steps of associating regions of a photo with their subject identifier information, or by prompting them to upload a photo of themselves which need not associate any region as by default there is only one photo provided, the operator can efficiently and effectively provide the opportunity of receiving personal galleries to interested people.

An example of the flow from a registering user's perspective is highlighted in FIG. 20. Here, one can arrive at a given weblink 600 which will grant access to once again what in FIG. 11I is the photo detail annexation component 330. One can arrive at this link by a variety of means such as being sent a link as in the FIG. 19 example, what in FIG. 20 appears to be the result of a QR code 601, by clicking on a link sent from a friend or event organizer, by direct entry into a browser or any other means. Upon arriving at the link, in this example the user is provided some contextual information and is prompted to submit a photo 602. Upon affirming an intention to do so, some options pop up including the ability to browse the associated device's photo library 603, take a photo 604 or browse to submit a photo 605. Upon proceeding and selecting an image to upload, in this example, selecting a portrait of oneself 606, one is prompted to provide a phone number or email 607 and to provide a digital version of informed consent by means of checking the box to agree on terms 608. With a phone number entered in this case, and the box checked off one can complete registration by clicking a submit button 609. In this example, it takes a few seconds to complete registration 610, and then one of a few screens can appear depending upon the settings for a given event. If someone isn't initially spotted or if the event is set up to share galleries at a later point, the registrant may receive a message confirming registration and setting expectations for what's next 611. If someone is spotted, they would receive their personal gallery immediately 612, thanks to the supporting processes of the system 90, previously described.

Special Case Facilitated Self-Registration: The Sharing En Masse of Event-Level Associated Self-Registration Weblinks by an Operator In yet another variant of FIG. 11I, the aforementioned streamlined method of enrolling people to the process of receiving their photos, rather than send texts, emails or other invitations individually, such invitations can be done en masse by an event photographer, event organizer or other administrator. If a given recipient within 11I wants to receive their photos 118, whatever mass communication an organizer or photographer had sent out would provide instructions for accessing a link to a photo detail annexation component 330. As in previous cases, a potential registrant can follow the prompts triggering sets of processes which can ultimately result in receipt of one's own photo gallery 128. Another neat component of this method, and which applies to several other methods making use of the photo delivery system 90, the invitations for registering for an event can occur before, during and/or after a given event.

Self-Registration Facilitated by Operator for Independent Use (QR Code, Business Card or Website)

In a final variant, similar to the above example, a QR code can be provided to event attendees through any form of signage, again, before, during or after an event, triggering the registration process functionally outlined in previous examples. Similarly, individuals may also be able to access such a link through a website, such as that for the photographer, event organizer or other stakeholder.

Self-Registration Facilitated by Operator for Independent Use with Weblink Mapping to Account-Holder Level and Using Recursive Searching Approach in Response to Absence of Presence of Event-Level Association In a variant of FIG. 11I, the designated registration link can map to the company-level itself, instead of to that of an event. The practical advantage of this lies in the fact that the operator, who presumably operates many different events, can utilize the same promotional materials across these different events which feature the same link or QR code. The operator does not need to create new links and materials to promote to the different audiences at each event. While it may not be the biggest deal to substitute an event specific link from FIG. 11I into a digital communication such as an email, the task of reprinting signage, QR codes, business cards and any other materials can be burdensome, wasteful and potentially costly. For this reason, there are advantages to using a single weblink which maps to the operating account holder-level in the system databases 127. Illustrated by the schematic in FIG. 11J, the weblink used to access the photo detail annexation component 330, has an embedded connection with a given account holder 510, by means of account information 227 within the system's databases 127. Without a direct association with a given event, in this scenario the recognition engine 126, will—as was the case with FIG. 11H—again rely upon governing logic 229 to point toward relevant sets of event photos stored in the system databases 127 for searching for a match. This will use a recursive process to either arrive at a match, rendering a private user gallery 128, or to set such registration information aside to remain eligible for a future match upon the receipt of additional photos 416.

Although this process is more complex than other workflows, such complexity is not experienced by the photo subject or the event operator(s) as the incremental time for the recursive process to perform is negligible. From the perspective of the event operator in particular, this method is welcomed for the simplicity of being able to use the same weblink, link-associated QR Code and/or other digital or printed materials across events.

Figure 17:
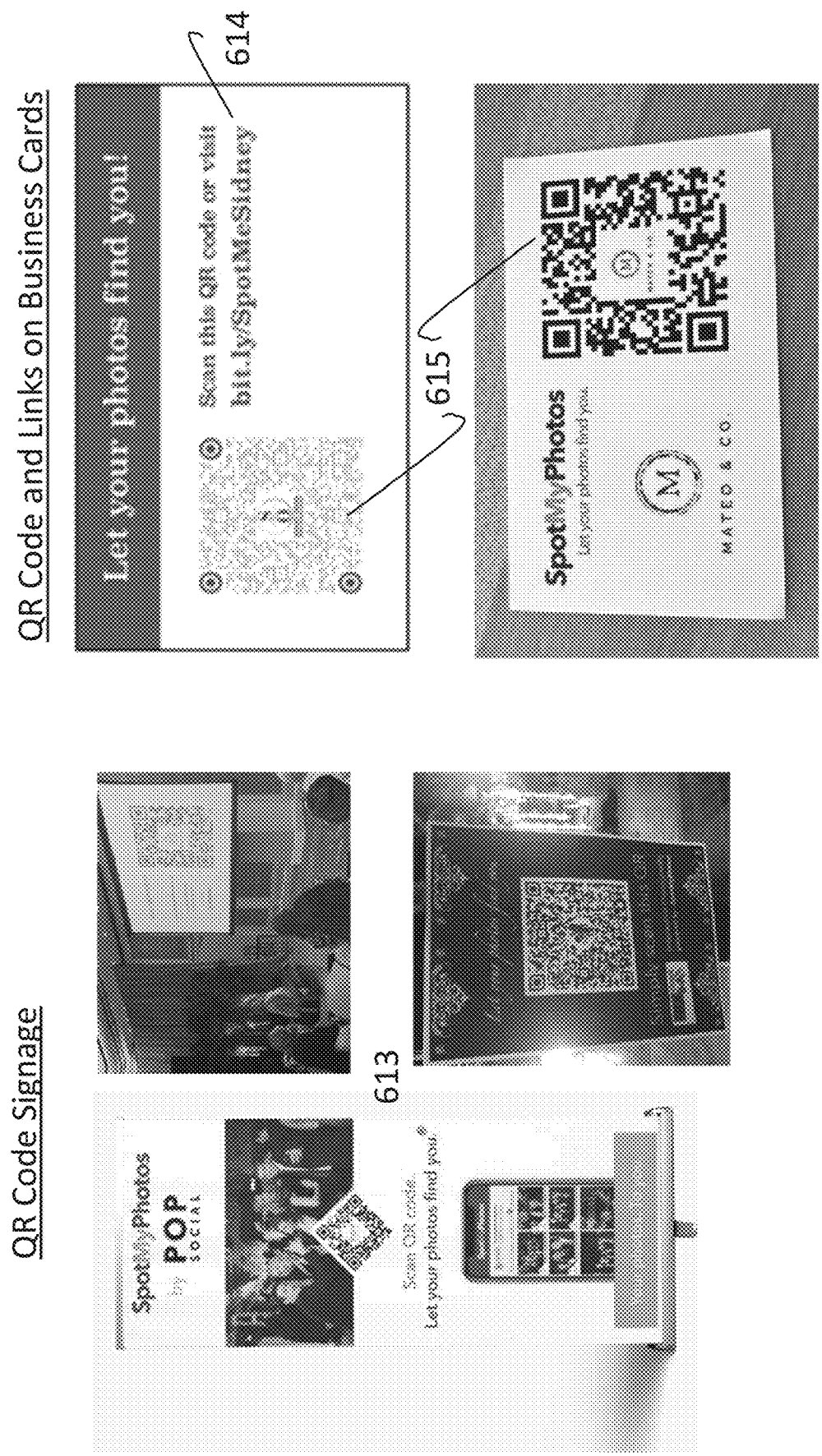
FIG. 17 showcases some of the promotional materials that may be used by event organizers, photographers or stakeholders enabling access to a single unique link that can facilitate self-registration across numerous events for a single operator's account in accord with an embodiment of the present invention.

In FIG. 17, such printed materials are showcased as examples including variants of signage featuring registration QR code links 613, as well as business cards showcasing QR codes 615 as well as a shortened URL 614, both of which, if followed, would lead the user to the same link and means of self-registration for what in this case takes place at the account-level, as was seen in FIG. 20. In these cases, the QR Codes, links and materials can be reused across events; whenever used they can a given user to a self-registration sequence, once again similar to that profiled in FIG. 20, and belonging to the greater workflow outlined in FIG. 11J.

Figure 11K:
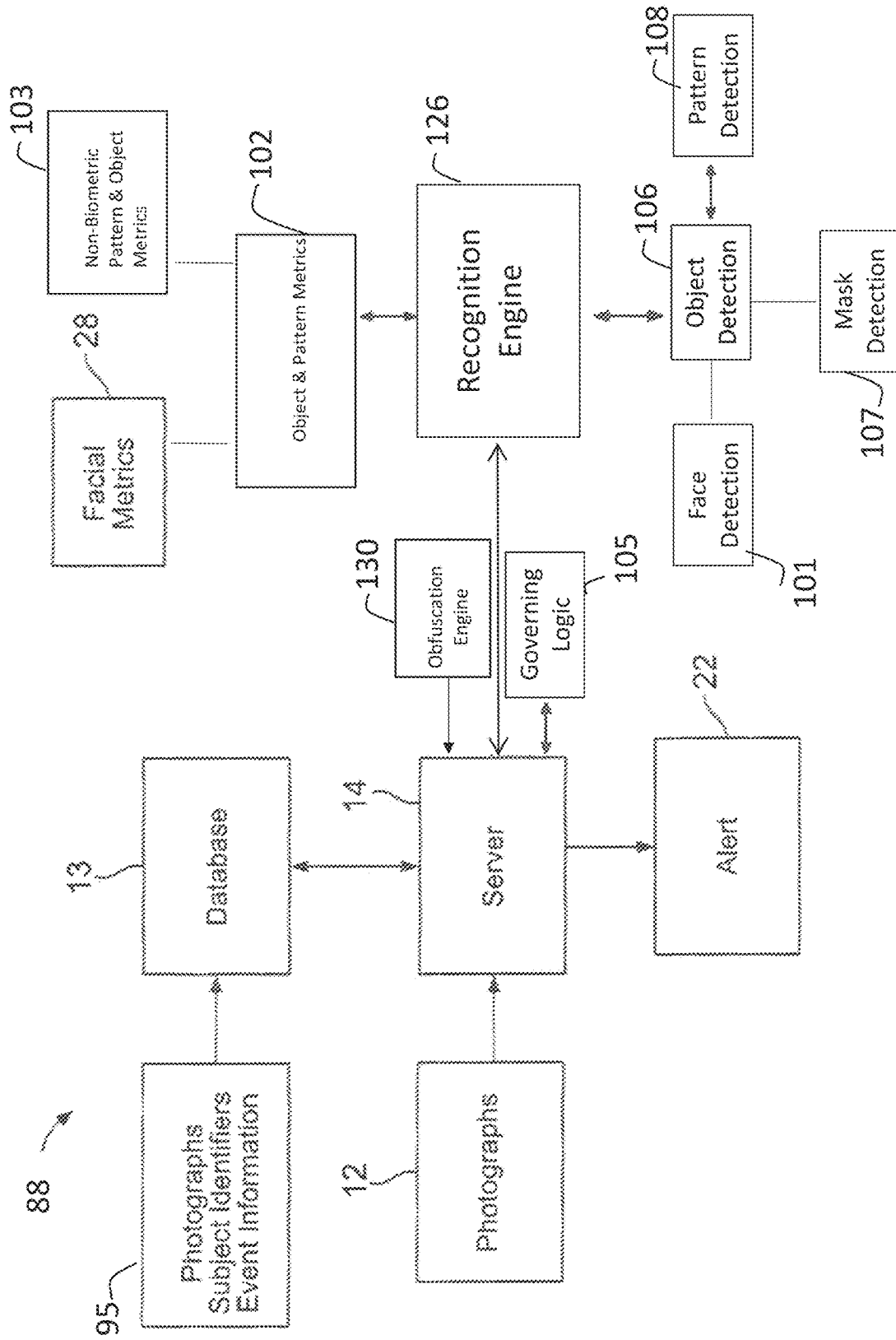
FIG. 11K is a schematic view outlining a special case of utilizing obfuscation engine as BIPA-friendly (Bio-metric Information Privacy Act) method for using recognition engine.

In another, more unique variant of the basic flow outlined in FIG. 10, in FIG. 11K, we see another flow that is identical in form to that of FIG. 10 yet includes one more component in the form of an obfuscation engine 130. In this case, such an engine is used to transform biometric image data into what is categorically non-biometric image data; that is, to use processes to blur and or distort by any of several methods the image of a detected face so that it no longer meets the definitional criteria for serving as legitimate biometric information, that is, containing unique physical characteristics or sets of characteristics; yet at the same time, such an altered image may still possess the characteristics allowing it to be defined as a detected face. By storing the original image and the rendered component of the image upon the server 14 within databases 13 which preserve the mapping of the original and transformed images to each other, the altered image component could be processed by the recognition engine 126, and depending upon governing logic 105, which can specify what may be relatively lower confidence level thresholds for allowing that image to be matched with other images which undergo a similar process, it is foreseeable that use of a recognition engine 126 will still be able to output matches, and upon doing so, the original image mapping to those matched obfuscated images may very well allow an individual to successfully connect with their actual non-altered images. This matching process is by no means as accurate as facial recognition performed upon cleaner data sets, however, it can foreseeably be "good enough" to result in instances of successful photo aggregation, particularly in the case of data sets with smaller sample sizes. Furthermore, this process can be made to be more accurate with the addition of using other non-biometric pattern and object metrics 103 which may also be derived from such transformed image components, rounding out what is a very novel and creative approach to satisfactorily using core principles of recognition technologies upon information that is categorically by design no longer defined as biometric information or as having traditional biometric identifiers. This general method may be useful for adhering to processes in line with the values and principles held by certain stakeholders and for enabling compliance with what can be strict biometric information privacy laws.

While the specific embodiments have been illustrated and described, numerous modifications come to mind without significantly departing from the spirit of the invention and the scope of protection is only limited by the scope of the accompanying.

I claim:

1. A photograph network sharing process comprising the steps of:
   (a) uploading one or more photographs to a server;
   (b) registering a user, wherein the step of registering a user includes:
      (i) providing the user with an option to consent to receiving one or more photographs stored on the server and that contain an image of the user;
      (ii) extracting object metrics from a photograph of the user, when the user consents to receiving the one or more photographs, defined as a registered user;
      (iii) creating a secure access to a photo gallery uniquely associated to the registered user and stored on the server;
      (iv) storing the primary object metrics on the server and linking the primary object metrics of the registered user to the photo gallery; and
      (v) providing the registered user with an unique subject identifier or unique link for access into the photo gallery uniquely associated to the registered user; and
   (c) processing the one or more photographs by the server after registration of the user occurs, wherein the step of processing the one or more photographs includes the steps of:

(i) extracting object metrics on a portion of the photo depicted within each photograph, of the one or more photographs; and (ii) creating a database on the server that links each photograph, of the one or more photographs to corresponding extracted object metrics;

(iii) matching and linking a photograph, of the one or more photographs uploaded to the server, to the registered user, wherein the step of matching and linking a photograph includes:

automatically comparing the primary object metrics with the extracted object metrics stored on the database and corresponding to any and all photographs, of the one or more photographs, uploaded to the server;

identifying a photograph, when comparing the primary object recognition metrics to the extracted object metrics contains a predetermined level of certainty that the photograph contains an image of the registered user; and (d) automatically linking the identified photograph to the photo gallery uniquely associated to the registered user, whereby the registered user accessing the photo gallery uniquely matched to the registered user gains access only to all identified photographs which contain the image of the registered user.

2. The photograph network sharing process of claim 1, wherein the object metrics is facial metrics and/or non-biometric objects, such as but not limited to color spectrum, shapes, geometry, or pattern detection extracted from areas of a photograph appearing within or proximate to a detected object.

3. The photograph network sharing process of claim 2, further comprising the steps of providing coordinates for non-biometric objects of subjects appearing in the uploaded photograph, and storing on the server the coordinates of non-biometric objects not recognized as containing the user.

4. The photograph network sharing process of claim 3, further comprising the step of segregating the unrecognized non-biometric objects from the upload photograph containing recognized non-biometric objects.

5. The photograph network sharing process of claim 4, further comprising the step of creating a group of photographs containing the non-biometric objects of each of the segregated unrecognized non-biometric objects.

6. The photograph network sharing process of claim 5, further comprising the step of providing an interface for the user to view the photographs of each group of the segregated unrecognized non-biometric objects.

7. The photograph network sharing process of claim 6, further comprising the step of allowing the user to share selected photographs from the group of photographs with a second user.

8. The photograph network sharing process of claim 7, further comprising the step of forwarding a photograph to another user when a subject therein is recognized with a specified level of certainty.

9. The photograph network sharing process of claim 1, further comprising the step of alerting the user when a photograph containing the user non-biometric objects is uploaded and forwarding such photograph to the user with the matching non-biometric objects.

10. The photograph sharing process of claim 9, wherein the step of forwarding the photograph includes event information associated with the photograph.

11. The photograph sharing process of claim 1, wherein the subject identifier is the subject email address.

12. The photograph sharing process of claim 1, wherein the subject identifier is the subject phone number.

13. The photograph sharing process of claim 1, wherein the step of uploading the photograph to a server is performed wirelessly.

14. The photograph network sharing process of claim 2, wherein one or more photographs is generally taken by a photographer at an event and the photographer is in control of the server.

15. The photograph network sharing process of claim 14, wherein the step of registering a user is a self-registration process of the user registering themselves with the server to access the one or more photographs.

16. The photograph network sharing process of claim 15, wherein the event uses a scannable QR code or weblink to access the server and for registering a user.

17. The photograph network sharing process of claim 16, wherein the QR code or weblink is a single QR code or single weblink used across multiple events.

18. A photograph network sharing process comprising the steps of:

(a) uploading one or more photographs to a server;

(b) processing the one or more photographs by the server, wherein the step of processing the one or more photographs includes the steps of:

(i) extracting object metrics on a portion of the photo depicted within each photograph, of the one or more photographs; and (ii) creating a database on the server that links each photograph, of the one or more photographs to corresponding extracted object metrics;

(c) registering a user, wherein the step of registering a user includes:

(i) providing the user with an option to consent to receiving one or more photographs stored on the server and that contain an image of the user;

(ii) extracting object metrics from a photograph of the user, when the user consents to receiving the one or more photographs, defined as a registered user;

(iii) creating a secure access to a photo gallery uniquely associated to the registered user and stored on the server;

(iv) storing the primary object metrics on the server and linking the primary object metrics of the registered user to the photo gallery; and (v) providing the registered user with an unique subject identifier or unique link for access into the photo gallery uniquely associated to the registered user; and (d wherein the processing of one or more photographs by the server further includes matching and linking a photograph, of the one or more photographs uploaded to the server, to the registered user, wherein the step of matching and linking a photograph includes:

automatically comparing the primary object metrics with the extracted object metrics stored on the database and corresponding to any and all photographs, of the one or more photographs, uploaded to the server;

identifying a photograph, when comparing the primary object recognition metrics to the extracted object metrics contains a predetermined level of certainty that the photograph contains an image of the registered user; and (e) automatically linking the identified photograph to the photo gallery uniquely associated to the registered user, whereby the registered user accessing the photo gallery uniquely matched to the registered user gains access only to all identified photographs which contain the image of the registered user.

19. The photograph network sharing process of claim 18, wherein the object metrics is facial metrics and/or non-biometric objects, such as but not limited to color spectrum, shapes, geometry, or pattern detection extracted from areas of a photograph appearing within or proximate to a detected object.

20. The photograph network sharing process of claim 19, further comprising the steps of providing coordinates for non-biometric objects of subjects appearing in the uploaded photograph, and storing on the server the coordinates of non-biometric objects not recognized as containing the user.

* * * * *